(12) United States Patent
Lewis

(10) Patent No.: US 12,547,696 B2
(45) Date of Patent: Feb. 10, 2026

(54) WIRELESS BATTERY MANAGEMENT SYSTEM SAFETY CHANNEL COMMUNICATION LAYER PROTOCOL

(71) Applicant: Analog Devices, Inc., Wilmington, MA (US)

(72) Inventor: Douglas Dealton Lewis, Durham, NC (US)

(73) Assignee: Analog Devices, Inc., Wilmington, MA (US)

( * ) Notice: Subject to any disclaimer, the term of this patent is extended or adjusted under 35 U.S.C. 154(b) by 309 days.

(21) Appl. No.: 18/059,506

(22) Filed: Nov. 29, 2022

(65) Prior Publication Data

US 2024/0037211 A1 Feb. 1, 2024

Related U.S. Application Data

(60) Provisional application No. 63/394,204, filed on Aug. 1, 2022.

(51) Int. Cl.
G06F 21/44 (2013.01)
G06F 16/903 (2019.01)

(52) U.S. Cl.
CPC .......... *G06F 21/44* (2013.01); *G06F 16/903* (2019.01)

(58) Field of Classification Search
CPC .............................. G06F 21/44; G06F 16/903
(Continued)

(56) References Cited

U.S. PATENT DOCUMENTS

2015/0028816 A1* 1/2015 Lee ................... H02J 13/00002
320/134
2021/0178907 A1* 6/2021 Murphy .................... B60L 7/02
(Continued)

FOREIGN PATENT DOCUMENTS

CN         104995814 A  * 10/2015  ............ H01M 10/48
EP         1775653 A3   *  5/2007  ............... G06F 1/26
(Continued)

OTHER PUBLICATIONS

Zografopoulos et al., "DERauth: A Battery-Based Authentication Scheme for Distributed Energy Resources," 2020 IEEE Computer Society Annual Symposium on VLSI (ISVLSI), Limassol, Cyprus, 2020, pp. 560-567, doi: 10.1109/ISVLSI49217.2020.00086. (Year: 2020).*

(Continued)

*Primary Examiner* — Peter C Shaw
(74) *Attorney, Agent, or Firm* — ArentFox Schiff LLP

(57) ABSTRACT

Systems, devices, and methods related to wireless battery management system (wBMS) are provided. For example, a wBMS network manager comprises a memory to store a list of hardware identifiers (IDs), wherein each hardware ID in the list is associated with a respective one of a plurality of battery modules; and mapped, based on a predetermined mapping, to a different one of a plurality of source IDs; an interface to receive, from a remote battery module, a packet including a source ID and a hardware ID associated with the remote battery module; and one or more processing units to search, using the source ID in the received packet and the predetermined mapping, for a first hardware ID from the list of hardware IDs; and authenticating the remote battery module based on a comparison of the hardware ID in the received packet to the first hardware ID from the list.

19 Claims, 11 Drawing Sheets

(58) Field of Classification Search
USPC .......................................................... 726/17
See application file for complete search history.

(56) References Cited

U.S. PATENT DOCUMENTS

| | | | | |
|---|---|---|---|---|
| 2021/0242508 | A1* | 8/2021 | Millen | H01M 10/48 |
| 2022/0082627 | A1 | 3/2022 | O'Mahony et al. | |
| 2022/0289068 | A1* | 9/2022 | Unagami | B60L 53/65 |
| 2022/0340039 | A1* | 10/2022 | Unagami | B60L 53/66 |
| 2024/0022085 | A1* | 1/2024 | Fujiyama | H01M 10/4257 |
| 2024/0037211 | A1* | 2/2024 | Lewis | G06F 21/44 |

FOREIGN PATENT DOCUMENTS

| | | | | | |
|---|---|---|---|---|---|
| KR | 2007025337 | A | * | 3/2007 | |
| KR | 20070025337 | A | * | 3/2007 | H04W 12/71 |
| WO | 2021220306 | A1 | | 11/2021 | |

OTHER PUBLICATIONS

Crocetti et al., "A Novel and Robust Security Approach for Authentication, Integrity, and Confidentiality of Lithium-ion Battery Management Systems," IEEE (IESES), Shanghai, China, 2023, pp. 1-6, doi: 10.1109/IESES53571.2023.10253728. (Year: 2023).*

Tang et al., "Research on Parameter Identification and Model Verification of Battery Energy Storage System," 2023 China Automation Congress (CAC), Chongqing, China, 2023, pp. 3555-3560, doi: 10.1109/CAC59555.2023.10451512. (Year: 2023).*

Khas et al., "SHA-512 based Wireless Authentication Scheme for Smart Battery Management Systems," 2019 8th International Conference on Renewable Energy Research and Applications (ICRERA), Brasov, Romania, 2019, pp. 968-972, doi: 10.1109/ICRERA47325.2019.8996531. (Year: 2019).*

Chen et al., "A Privacy-Preserving Authentication Protocol for Electric Vehicle Battery Swapping Based on Intelligent Blockchain," in IEEE Internet of Things Journal, vol. 11, No. 10, pp. 17538-17551, 15 May 15, 2024, doi: 10.1109/JIOT.2024.3360280. (Year: 2024).*

Visnu et al., "Various Types of Wireless Battery Management System in Ev," 2020 IEEE International Students' Conference on Electrical, Electronics and Computer Science (SCEECS), Bhopal, India, 2020, pp. 1-5, doi: 10.1109/SCEECS48394.2020.115. (Year: 2020).*

Lee et al., "Wireless battery management system," 2013 World Electric Vehicle Symposium and Exhibition (EVS27), Barcelona, Spain, 2013, pp. 1-5, doi: 10.1109/EVS.2013.6914889. (Year: 2013).*

Muneer et al., "A Way Towards Energy Autonomous Wireless Sensing for EV Battery Management System," in IEEE Journal of Microwaves, vol. 5, No. 3, pp. 555-571, May 2025, doi: 10.1109/JMW.2025.3557211. (Year: 2025).*

Shell et al., "Implementation of a wireless battery management system (WBMS), " 2015 IEEE International Instrumentation and Measurement Technology Conference (I2MTC) Proceedings, Pisa, Italy, 2015, pp. 1954-1959, doi: 10.1109/I2MTC.2015.7151581. (Year: 2015).*

International Search Report and Written Opinion in PCT/US2023/070520, mailed Oct. 10, 2023, 11 pages.

* cited by examiner

WIRELESS BATTERY MANAGEMENT SYSTEM SAFETY CHANNEL COMMUNICATION LAYER PROTOCOL

CROSS REFERENCE TO RELATED APPLICATIONS

The present application claims priority to and the benefit of U.S. Provisional Patent Application No. 63/394,204 entitled "SOURCE IDENTIFIER (ID) LOOKUP AND AUTHENTICATION IN A WIRELESS BATTERY MANAGEMENT SYSTEM BLACK CHANNEL/SAFETY COMMUNICATION LAYER PROTOCOL" and filed Aug. 1, 2022, which is hereby incorporated by reference in its entirety as if fully set forth below and for all applicable purposes.

TECHNICAL FIELD OF THE DISCLOSURE

The present disclosure generally relates to battery management systems, and more particularly to a safety channel communication layer protocol for a wireless battery management system (wBMS).

BACKGROUND

A battery pack may typically include battery cells that are physically connected in series and/or parallel to provide a certain desired power. Large battery packs are commonly used in hybrid and/or electrical vehicles, for example, to generate high voltages for driving components such as automotive motors in the vehicles. Batteries are complex electrochemical components with subtle behaviors. Their performances may depend heavily on internal and external conditions (e.g., aging, temperature, etc.). In order to keep track of these performances and battery states, a battery pack may be equipped with a battery management system. The battery management system may be responsible for providing safe use of the battery and estimate, as accurately as possible, the states of the battery pack such as its state of health (SOH), state of power (SOP), and state of charge (SOC). The SOC may provide information about the current amount of energy stored in the battery pack. The SOP may indicate the battery capability of providing the required power. The SOH is a figure of merit that may indicate the battery level of degradation.

In some systems, such as an electrical vehicle, may use large battery packs including a large number of battery cells. For instance, a large battery pack may include about ten battery modules, each including about twelve battery cells connected in series. As such, a large wiring harness may be required to monitor all the individual cells. The large wiring harness may have a negative impact on the cost, weight, and reliability of the battery pack. Accordingly, it may be desirable to replace the physical wiring between the measurement electronics and the central battery monitor manager by a wireless network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1A:
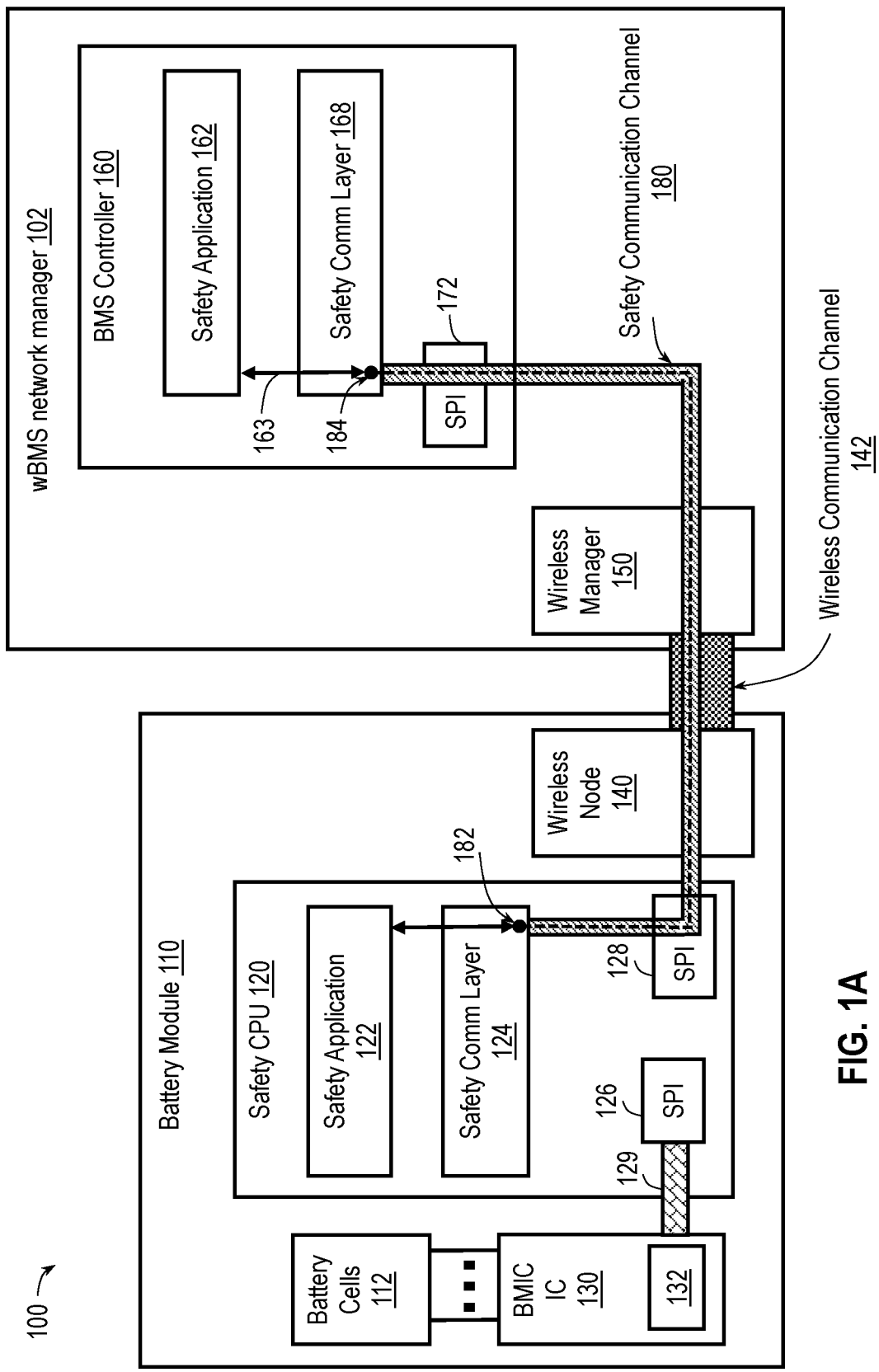
FIG. 1A is a schematic diagram illustrating an exemplary wireless battery management system (wBMS) that provisions for a safety communication channel, according to some embodiments of the present disclosure.

The systems, methods and devices of this disclosure each have several innovative embodiments, no single one of which is solely responsible for all of the desirable attributes disclosed herein. Details of one or more implementations of the subject matter described in this specification are set forth in the description below and the accompanying drawings.

A wireless battery management system (wBMS) may include a plurality of battery modules in communication with a wBMS network manager over a wireless network. For example, each battery module may include a plurality of battery cells and a wireless node, and the wBMS network manager may include a battery management system (BMS) controller (e.g., a host controller) and a wireless manager. The wireless manager at the wBMS network manager may manage and communicate with the wireless nodes at the battery modules, for example, to form the wireless network. The BMS controller may manage the battery cells at the battery modules, for example, by monitoring the states of each battery cell such as its state of health (SOH), state of power (SOP), and/or state of charge (SOC) and controlling the operations of the battery cells at the modules. In some examples, each battery module may be interconnected with the BMS controller via a respective logical channel. The BMS controller may communicate with each battery module over a wireless communication channel or link. For example, the BMS controller may interface with the wireless manager to transmit and/or receive a radio frequency (RF) communication signal. Similarly, each battery module may transmit and/or receive an RF communication signal via a respective wireless node at the battery module.

Developments in automotive technologies have led to a development of standards within the automotive community to advance the state of automotive and/or AV technologies and to use and/or design automotive equipment, component, and/or system that is functionally safe. An example of such a standard is the international organization for standardization (ISO) 61784-3, which establishes safety integrity requirements for transmissions of safety-relevant messages. In order to achieve safety integrity in a wBMS, there is a need for techniques to mitigate the potential for addressing and masquerading failures in the wBMS.

Accordingly, the present disclosure provides mechanisms for authenticating a battery module in a wBMS so that safety data can be communicated. To that end, each battery module in the wBMS may have a logical channel connection with a wBMS network manager at the network side. The logical channel connection may be part of an SCL protocol. For instance, a battery module may send a connect request message to the wBMS network manager and may include a source address or identifier (ID) in the connect request message. The source ID may uniquely identify the battery module in the wBMS and may be generated from a safety integrity compliant hardware component or part (e.g., according to ISO 61784-3 and/or ISO 26262) at the battery module. The authentication may establish or verify the authenticity of a source address in a connect request message for an individual logical channel connection. As used herein, safety data may include battery measurements related to a battery module and/or instructions for controlling the operations of the battery module.

According to an aspect of the present disclosure, a wBMS may include a wBMS network manager (on the network side) managing a plurality of battery modules via a wireless network. In an example, the plurality of battery modules may be part of a battery pack, and each battery module can include a plurality of battery cells. The wBMS network manager may store a list of hardware identifiers (IDs), for example, at a memory on the network side. Each hardware ID in the list may be associated with a respective one of the plurality of battery modules. Further, each hardware ID may be mapped to a different one of a plurality of source IDs based on a predetermined mapping. Stated differently, the wBMS network manager may store a list of hardware IDs identifying battery modules that are monitored and managed by the wBMS network manager and corresponding source IDs that the wBMS network manager may use to establish respective safety communication channels with the battery modules.

In some aspects, each individual hardware ID in the list of hardware IDs may identify a hardware component in a respective battery module of the plurality of battery modules, where the hardware component has passed a safety integrity check. For instance, the hardware component may be associated (or compliant) with a certain safety integrity level (e.g., defined in ISO 61784-3 and/or ISO 26262). In some aspects, an individual hardware ID in the list of hardware IDs is a serial ID of a battery monitor at a respective battery module of the plurality of battery modules. In other aspects, an individual hardware ID in the list of hardware IDs may be associated with a memory state (e.g., an initial state of a memory) of a respective battery module of the plurality of battery modules. In general, each hardware ID may uniquely identify a respective one of the plurality of battery modules in the wBMS.

The wBMS network manager may receive a message (e.g., a connect request) from a remote battery module over the wireless network (e.g., via an interface to a wireless transceiver at the wBMS network manager). The message may include a packet including a source ID and a hardware ID associated with the remote battery module. To achieve safety integrity, the wBMS network manager may perform authentication on the received packet (e.g., using one or more processing units at the wBMS network manager). To that end, the wBMS network manager may search for a first hardware ID from the list of hardware ID using the source ID in the received packet and the predetermined mapping. The wBMS network manager may authenticate the remote battery module based on a comparison of the hardware ID in the received packet to the first hardware ID from the list. If there is a match between the hardware ID in the received packet and the first hardware ID from the list, the authentication is successful. Accordingly, the wBMS network manager may transmit an indication of a successful authentication to the remote battery module. If, however, there is a mismatch between the hardware ID in the received packet and the first hardware ID, the authentication is unsuccessful. Accordingly, the wBMS network manager may transmit an indication of an authentication failure to the remote battery module.

The predetermined mapping between the hardware IDs and the source IDs may be configured in various ways. In one aspect, the predetermined mapping may be based on an order in which hardware IDs are stored in the memory. Accordingly, the wBMS network manager may search for the first hardware ID from the list by using the source ID as an index into the list of hardware IDs. For instance, the wBMS network manager may read the first hardware ID from the location of the memory that is referenced by the source ID (in the received packet). In another aspect, the predetermined mapping may be based on a hash function being applied on the hardware IDs. Accordingly, the wBMS network manager may search for the first hardware ID from the list by applying the hash function to the list of hardware IDs to generate a hash key for each hardware ID in the list. For instance, the wBMS network manager may read the first hardware ID from the list that is mapped to a hash key matched to the source ID (in the received packet).

In some aspects, a safety communication channel may be established between the wBMS network manager and the remote battery module based on a successful authentication, and the wBMS network manager and the remote battery module may communicate with each other over the safety communication channel. Subsequent packets for communications over the safety communication channel may include a header including the source ID that was used to establish the safety communication channel. For example, the wBMS network manager may receive another packet (e.g., a second packet) from the remote battery module via the safety communication channel. The second packet may have a packet header including an indication of the source ID associated with the remote battery module and a payload including battery measurement data (e.g., voltage, current, or temperature measured from the remote battery module). Additionally or alternatively, the wBMS network manager may transmit a packet (e.g., a third packet) to the remote battery module via the safety communication channel. The third packet may have a packet header including an indication of the source ID associated with the remote battery module and a payload including a control instruction for the remote battery module. For instance, the instruction may instruct the remote battery module to open a switch to disconnect the remote battery module from the pack when a fault is detected at the remote battery module based on measurement data received from the remote batter module.

According to a further aspect of the present disclosure, a remote battery module may facilitate authentication in a wBMS. For example, a remote battery module may store a list of hardware IDs at a memory of the remote battery module. Each hardware ID in the list may be associated with a respective one of a plurality of battery modules, where the remote battery module may be one of the plurality of battery modules. Each hardware ID may be mapped, based on a predetermined mapping, to a different one of a plurality of source IDs. The predetermined mapping at the remote battery module may be configured in the same way as the corresponding wBMS network manager, for example, based on an order of the hardware IDs in the list or based on an application of a hash function to the hardware IDs as discussed above. In some aspects of the remote battery module, the hardware ID associated with the remote battery module may correspond to a hardware ID of a hardware component at the remote battery module, where the hardware component has passed a safety integrity check. For instance, the hardware component may be associated with a certain safety integrity level (e.g., defined in ISO 61784-3 and/or ISO 26262). In some aspects, the hardware ID associated with the remote battery module may be a serial ID of a battery monitor at the remote battery module. In some aspects, the hardware ID associated with the remote battery module may be a memory state (e.g., an initial state of a memory) associated with the first battery module. In some aspects, the remote battery module may determine its hardware ID is one of the hardware IDs in the stored list (e.g., as part of an authentication at the remote battery module). The remote battery module may determine a source ID based on the predetermined mapping and its hardware ID. The remote battery module may transmit a packet (e.g., a connect request) to a wBMS network manager, where the packet may include the hardware ID associated with the remote battery module and the determined source ID.

The systems, schemes, and mechanisms described herein advantageously provide authentication mechanisms for establishing a safety communication channel in a wBMS. The disclosed authentication mechanisms use the hardware ID of a safety integrity compliant hardware component as a base to generate a logical channel source ID so that a safety communication channel can be established (or tunneled) through a communication path that involves other components that may not have passed a safety integrity compliance check. In some instances, a safety communication channel that tunnels through a communication path involving safety non-compliant components may be referred to as a black channel. Stated differently, the present disclosure advantageously provides techniques to authenticate a battery module over a black channel in a wBMS for safety data transfer.

Figure 1B:
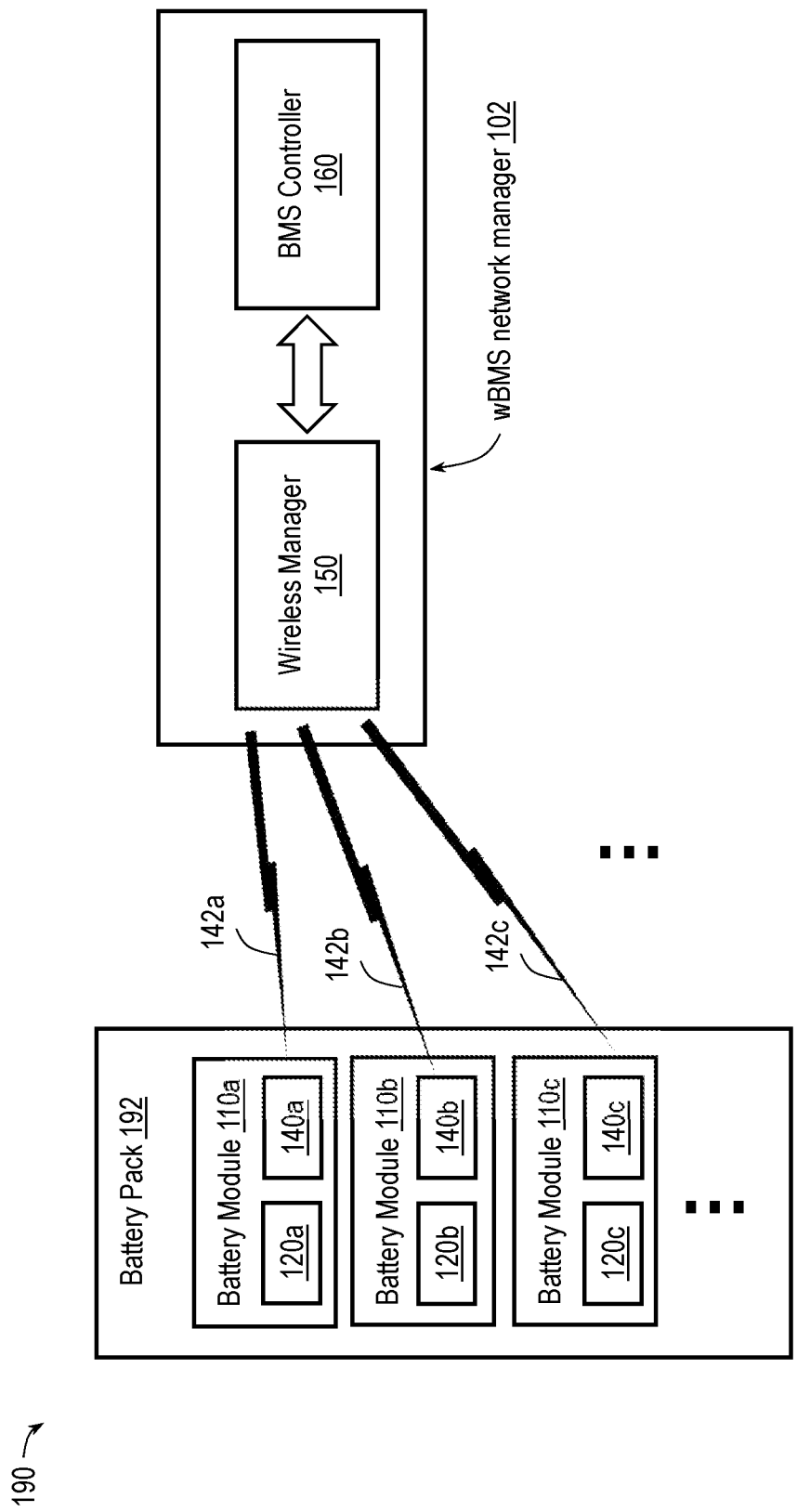
FIG. 1B is a schematic diagram illustrating an exemplary wBMS that provisions for a safety communication channel, according to some embodiments of the present disclosure.

FIG. 1A is a schematic diagram illustrating an exemplary wBMS 100 that provisions for a safety communication channel, according to some embodiments of the present disclosure. As shown in FIG. 1A, the wBMS 100 may include a wBMS network manager 102 including a battery management system (BMS) controller 160 and a wireless manager 150 on the network side. The wBMS network manager 102 may manage a plurality of remote battery modules 110 over a wireless network. A battery module 110 may include a plurality of battery cells 112 (e.g., connected in series), a battery monitor integrated circuit (BMIC) 130, a safety central processing unit (CPU) 120, and a wireless node 140. For simplicity, FIG. 1A illustrates the wBMS network manager 102 managing one battery module 110. However, the wBMS network manager 102 may manage any suitable number of battery modules 110 (e.g., 2, 3, 4, 5, 6, 7, 8, 9, 10 or more), for example, as shown in FIG. 1B.

At a high level, the wireless manager 150 may be configured to manage the wireless network in the wBMS 100. The wireless manager 150 may be responsible for establishing and/or maintaining a wireless communication channel 142 with each respective wireless node 140 for communicating data over the air. The BMIC 130 may perform measurements (e.g., voltages, current, and/or temperature) related to the battery cells 112. The BMS controller 160 may be responsible for establishing and/or maintaining a logical channel connection, which may be referred to as a safety communication channel 180, with the safety CPU 120 at each respective battery module 110. The safety communication channel 180 may be (e.g., a tunnel) over the wireless communication channel 142. The safety CPU 120 of each battery module 110 may communicate battery measurements with the BMS controller 160 over the safety communication channel 180.

At the battery module 110, the BMIC 130 may be coupled to the battery cells 112 (e.g., via wires). In some instances, the BMIC 130 can be a monolithically integrated circuit as shown. In other instances, a battery monitor can be an integrated module including multiple integrated circuits (ICs) or other circuit elements within a commonly shared integrated circuit device package, as illustrative examples. The BMIC 130 may be uniquely identified by a serial ID 132, which is a hardware ID and may be stored at the BMIC 130. In an aspect, the BMIC 130 may be a part that has passed a safety integrity check (e.g., according to ISO 61784-3 and/or ISO 26262). The BMIC 130 may measure or sample (e.g., periodically at time intervals of 100 ms, 200 ms, etc.) the battery voltages of the battery cells 112 to monitor the battery level. The BMIC 130 may also measure and monitor current and/or temperature of the battery cells 112.

The safety CPU 120 may include at least two serial peripheral interfaces (SPIs) 126 and 128. The safety CPU 120 may interface with the BMIC 130 using the SPI 126 (e.g., over an SPI channel 129) and may interface with the wireless node 140 using the SPI 128 (e.g., over another SPI channel which forms part of the safety communication channel 180). In some examples, the safety CPU 120, the BMIC 130, and the wireless node 140 can be on the same circuit board. The safety CPU 120 may be a processing unit that has passed a safety integrity test (e.g., as specified by ISO 61784-3 and/or ISO 26262). That is, the safety CPU 120 is a safety integrity compliant part. In some instances, the wireless node 140 may also be a safety integrity compliant part. In other examples, the wireless node 140 may not be a safety integrity compliant part. In some examples, the safety CPU 120 may be similar to the data processing system 2300 of FIG. 10.

At the wBMS network manager 102, the BMS controller 160 may include at least one SPI 172 for interfacing with the wireless manager 150 over an SPI channel which forms part of the safety communication channel 180. In some examples, the BMS controller 160 and the wireless manager 150 may be separate parts, for example, on the same circuit board. In other examples, the BMS controller 160 and the wireless manager 150 can be integrated into a single part. In general, the BMS controller 160 and the wireless manager 150 may be arranged in any suitable ways. In some examples, the BMS controller 160 may be similar to the data processing system 2300 of FIG. 10.

To facilitate communication in the wBMS over the wireless network, each of the wireless manager 150 and the wireless node 140 may have a wireless transceiver (e.g., a radio transceiver) configured to transmit and/or receive over the air, where the BMS controller 160 may interface with the wireless manager 150, and the safety CPU 120 may interface with the wireless node 140 as discussed above. In general, the wireless manager 150 and the wireless node 140 may communicate with each other using any suitable wireless communication protocol and/or at any suitable frequency. In certain examples, the wireless communication channel 142 may be a 2.4 GHz channel. In some examples, the wireless manager 150 and/or the wireless node 140 may be similar to the RF device 2200 of FIG. 11.

Various software components may be executed by the safety CPU 120. For simplicity, FIG. 1A only shows the software components (e.g., a safety application 122 and an SCL 124) that are salient to safety communication in the wBMS 100 but may include any other suitable software components. Similarly, various software components may be executed by the BMS controller 160. For simplicity, FIG. 1A only shows the software components (e.g., a safety application 162 and an SCL 168) that are salient to safety communication in the wBMS 100 but may include any other suitable software components, such as a user interface, an interface layer, a hardware abstraction layer (HAL), etc.

At the battery module 110, the SCL 124 may establish the safety communication channel 180 with the BMS controller 160 or more specifically with the SCL 168. In some instances, the establishment of the safety communication channel 180 may be initiated by the safety application 122 (e.g., at power up or when the safety CPU 120 is initialized or re-initialized). The initiation may cause the SCL 124 to transmit a connect request message or packet to the BMS controller 160. At the BMS controller 160, the SCL 168 may receive a connect request message from the battery module 110 (or more specifically from the SCL 124). In response, the SCL 168 may perform authentication. Upon a successful authentication, the SCL 168 may transmit a connect response indicating the successful authentication, and the safety communication channel 180 may be established. Conversely, upon a failed authentication, the SCL 168 may transmit a connect response indicating an authentication failure and no safety communication channel 180 may be established. In some aspects, the safety CPU 120 may also perform authentication (e.g., to authenticate the BMIC 130) prior to transmitting a connect request message to the BMS controller 160. Mechanisms for performing authentication to establish the safety communication channel 180 will be discussed more fully below.

As shown in FIG. 1A, the safety communication channel 180 may extend from one end point 184 at the SCL 168 to the other end point 182 at the SCL 124 of the battery module 110. In some instances, the safety communication channel 180 may be referred to as a tunnel, which may be over the SPI 128, the wireless communication channel 142, and the SPI 172. The safety communication channel 180 can be used to transfer safety data between the safety application 122 at the safety CPU 120 and the safety application 162 at the BMS controller 160. The transfer of the safety data is shown by the arrow 163. In some instances, the safety application 162 may also communicate (e.g., non-safety data) directly with the interface layer 170, e.g., bypassing the SCL 168.

In an aspect, the battery module 110 may transmit, and the wBMS network manager 102 may receive battery measurements (e.g., voltages, current, temperatures, etc.) related to the battery module 110. To that end, the safety application 122 may receive the battery measurements from the BMIC 130. The safety application 122 may provide the battery measurements to the SCL 124. The SCL 124 may encapsulate the battery measurements with a safety packet header to generate a safety packet for transmission over the safety communication channel 180. The SCL 168 (at the BMS controller 160) may receive the safety packet encapsulated with the battery measurements from the safety communication channel 180. The SCL 168 may remove the safety packet header and provide the battery measurements (of the battery module 110) to the safety application 162. The safety application 162 may determine the health and/or performance of the battery module 110 based on the received battery measurements. In some examples, the safety application 122 may also detect various faults (e.g., related to functional safety) at the battery module 110 and may provide information about the faults to the SCL 124 for transmission to the BMS controller 160.

In an aspect, the wBMS network manager 102 may transmit, and the battery module 110 may receive control instructions for the battery module 110. To that end, the safety application 162 may determine a certain control for the battery module 110. For instance, the battery module 110 may have performance issues, and thus the safety application 162 may instruct the battery module 110 to be disconnected from a respective battery pack (e.g., the battery pack 192 in FIG. 1B). The safety application 162 may provide the control instruction(s) to the SCL 168. The SCL 168 may encapsulate the control instruction(s) with a safety packet header to generate a safety packet for transmission over the safety communication channel 180. The SCL 124 (at the safety CPU 120) may receive the safety packet encapsulated with the control instruction(s) from the safety communication channel 180. The SCL 1624 may remove the safety packet header and provide the received control instruction(s) to the safety application 122. The safety application 122 may coordinate with the BMIC 130 to perform operation(s) as instructed by the control instruction.

While not shown in FIG. 1A, the safety CPU 120 at the battery module 110 and/or the BMS controller 160 can include other software and/or hardware components to facilitate the monitoring of the SOH, SOP, and/or SOC of the battery module 110. Further, while FIG. 1A illustrates the use of SPIs 126, 128, and 172 as interfaces between different hardware modules, in general, any suitable interfaces can be used in place of the SPIs 126, 128, and 172.

FIG. 1B is a schematic diagram illustrating an exemplary wBMS 190 that provisions for a safety communication channel, according to some embodiments of the present disclosure. The wBMS 190 shares many elements with the wBMS 100 of FIG. 1A and the same reference numerals as in FIG. 1A are used in FIG. 1B to refer to the same or analogous elements of FIG. 1B; for brevity, a discussion of these elements is not repeated, and these elements may take the form of any of the embodiments disclosed herein.

As shown in FIG. 1B, the wBMS 190 may include a wBMS network manager 102 on the network side substantially similar to the wBMS 100. The wBMS 190 may further include a battery pack 192 including a plurality of battery modules 110 (shown as 110a, 110b, 110c, . . . ) as discussed herein. In some examples, the wBMS 190 may be part of an electrical vehicle. In general, the wBMS 190 may be part of any suitable system that is powered by at least the battery pack 192.

Each battery module 110 may include a wireless node 140 in communication with the wireless manager 150 at the wBMS network manager 102. For instance, the battery module 110a may include a wireless node 140a to communicate with the wireless manager 150 via a wireless communication channel 142a, the battery module 110b may include a wireless node 140b to communicate with the wireless manager 150 via a wireless communication channel 142b, and the battery module 110c may include a wireless node 140c to communicate with the wireless manager 150 via a wireless communication channel 142c.

Figure 2:
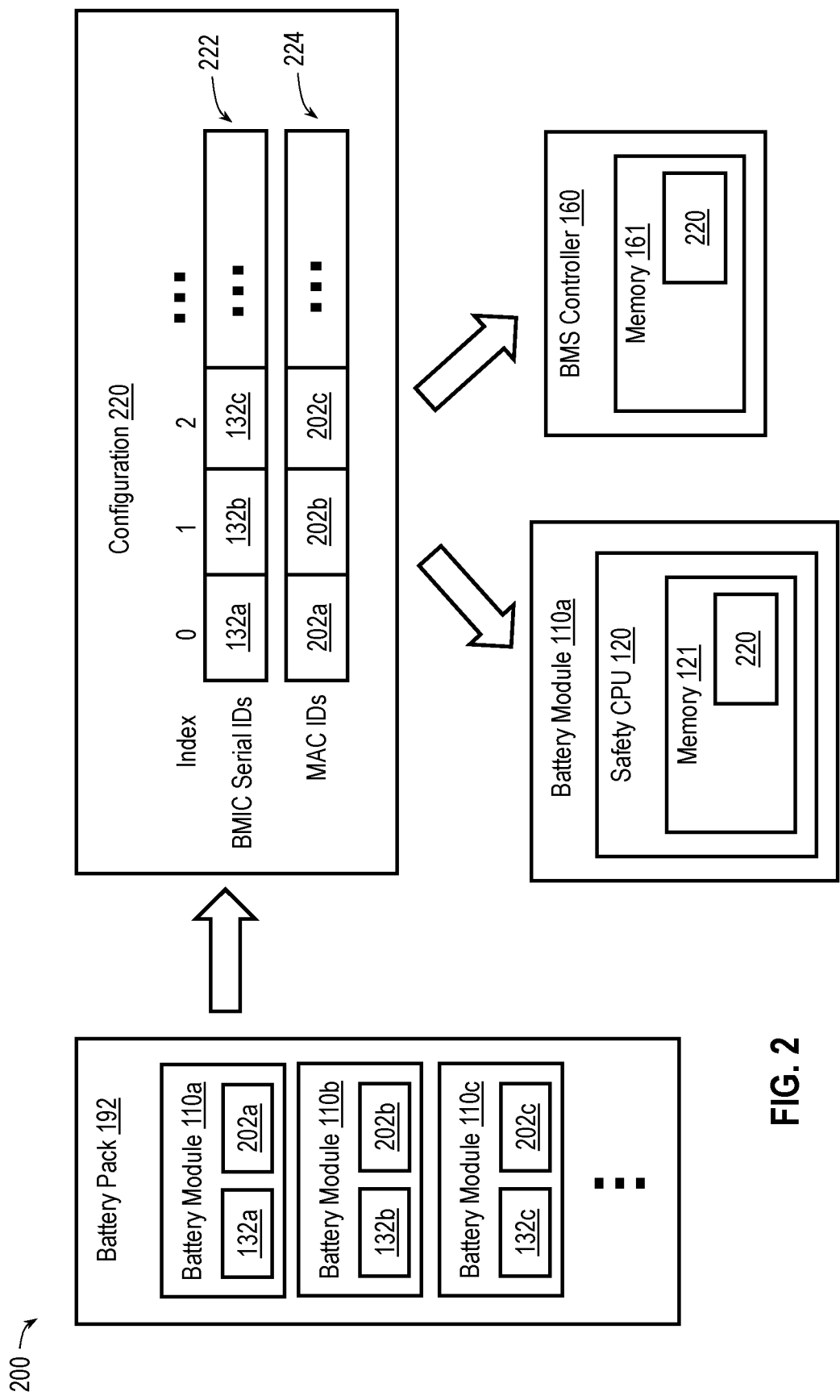
FIG. 2 illustrates an exemplary wBMS configuration generation and storage scheme for provisioning a safety communication channel in a wBMS, according to some embodiments of the present disclosure.
Figure 3:
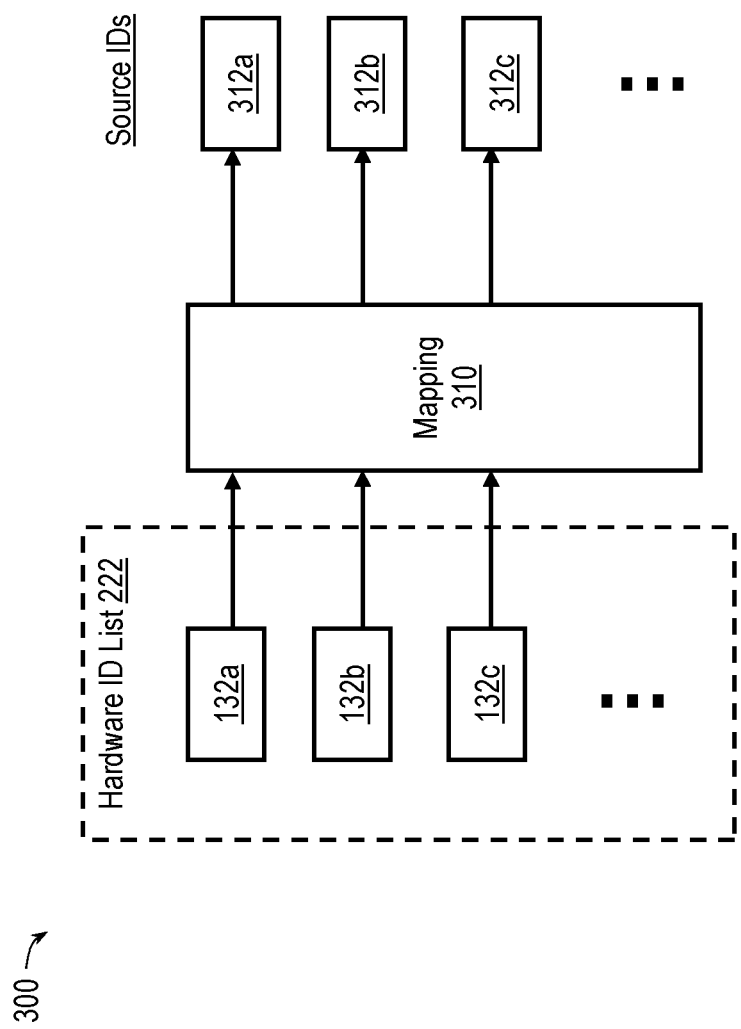
FIG. 3 illustrates an exemplary hardware ID-to-source ID mapping scheme for provisioning a safety communication channel in a wBMS, according to some embodiments of the present disclosure.
Figure 5:
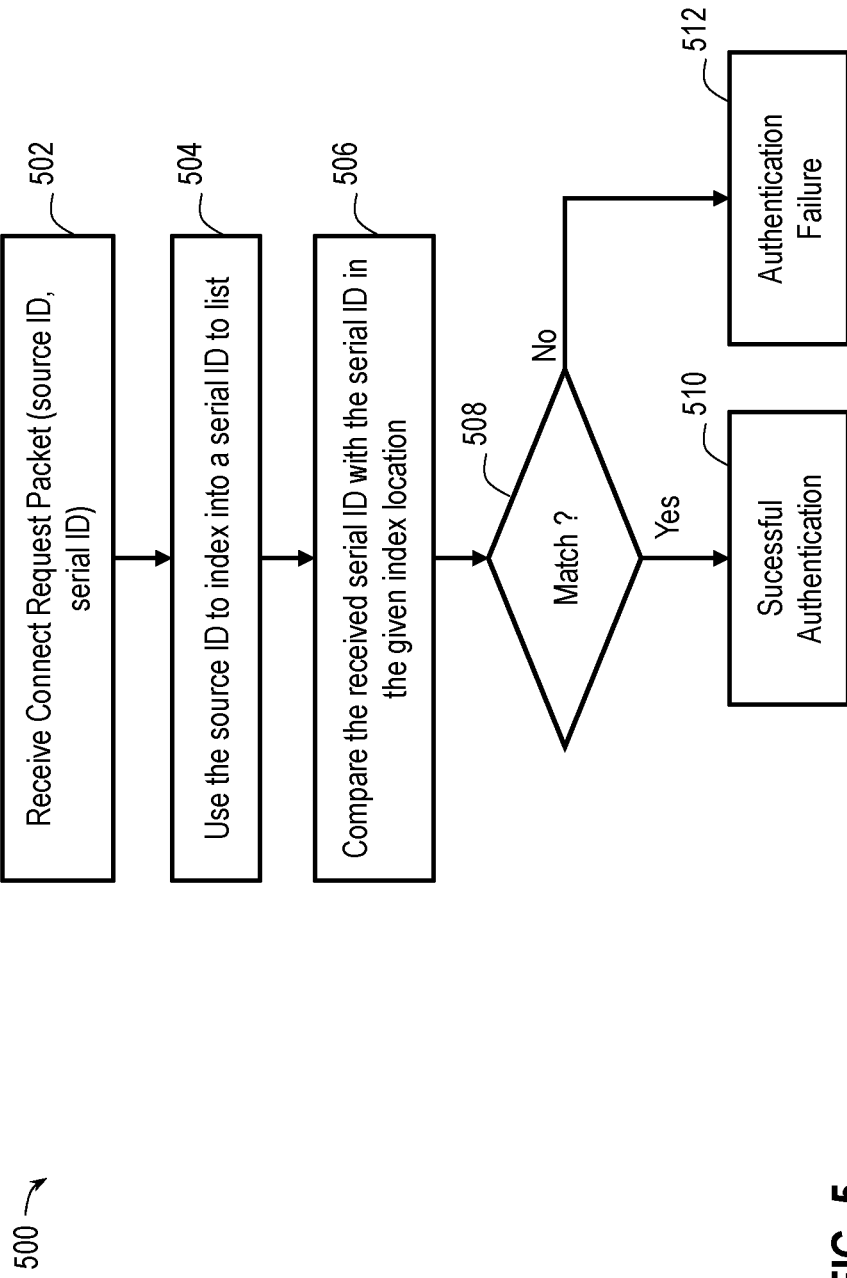
FIG. 5 is a flow diagram of an exemplary method for authenticating a remote battery module in a wBMS for communication over a safety communication channel, according to some embodiments of the present disclosure.
Figure 6:
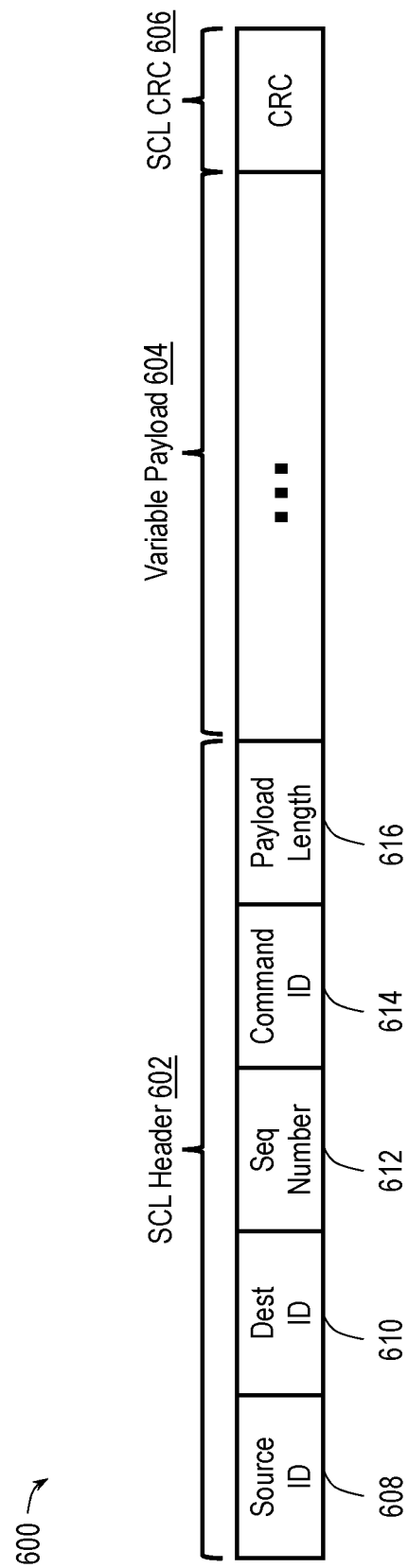
FIG. 6 illustrates an exemplary safety communication layer (SCL) protocol packet, according to some embodiments of the present disclosure.

Each of the battery module 110 or more specifically a respective safety CPU 120 at the battery module 110 may establish a safety communication channel (e.g., the safety communication channel 180) over a respective wireless communication channel 142 with the BMS controller 160 for communicating safety data (e.g., the voltages, current, and/or temperatures of the respective battery module 110). As shown, the battery module 110a may include a safety CPU 120a, the battery module 110b may include a safety CPU 120b, and the battery module 110c may include a safety CPU 120c, and so on. In aspect, each of the battery module 110 may be identified by a unique hardware ID, and a predetermined mapping may be used to map the respective hardware ID to a logical connection ID (e.g., a source ID), which may be used for authentication when establishing the respective safety communication channel. FIGS. 2-3 illustrate the generation and mapping of hardware IDs of the battery modules 110 to respective source IDs. FIGS. 4-5 and 7-8 illustrate various mechanisms for authenticating a battery module 110. FIG. 6 illustrates an example safety communication protocol packet structure for communication over the safety communication channel.

FIG. 2 is discussed in relation to FIGS. 1A-1B. FIG. 2 illustrates an exemplary wBMS configuration generation and storage scheme 200 for provisioning a safety communication channel in a wBMS (e.g., the wBMS 100 and/or 190), according to some embodiments of the present disclosure. As shown in FIG. 2, each of the battery module 110 at the battery pack 192 may include a BMIC serial ID 132 and a media access control (MAC) ID 202. The BMIC serial ID 132 may be a serial ID of a BMIC 130 at the respective battery module 110, and the MAC ID 202 may be a MAC ID of a wireless node 140 at the respective battery module 110. For instance, the battery module 110a may have a BMIC serial ID 132a and a MAC ID 202a, the battery module 110b may have a BMIC serial ID 132b and a MAC ID 202b, the battery module 110c may have a BMIC serial ID 132c and a MAC ID 202c, and so on.

A configuration 220 may be generated to store the BMIC serial ID 132 and the MAC ID 202 of each battery module 110. In an aspect, the configuration 220 may store the BMIC serial IDs 132 of the battery modules 110 in a list 222 arranged in a certain order. Further, the respective MAC IDs 202 of the battery modules 110 may be stored in a list 224 arranged in the same order as the BMIC serial IDs 132. In the illustrated example of FIG. 2, the BMIC serial ID 132a of the battery module 110a may be referenced by an index 0 in the list 222 and the MAC ID 202a of the battery module 110a may be referenced by the same index 0 in the list 224. In a similar way, the BMIC serial ID 132b of the battery module 110b may be referenced by an index 1 in the list 222, and the MAC ID 202b of the battery module 110b may be referenced by the same index 1 in the list 224.

The configuration 220 may be used for establishing a safety communication channel (e.g., the safety communication channel 180) between a battery module 110 and the BMS controller 160 at the wBMS network manager 102 as will be discussed more fully below. To facilitate the establishment of a safety communication channel, the configuration 220 may be stored at a memory 121 of each battery module 110. In order not to clutter the drawing of FIG. 2, the storage of the configuration 220 is only shown for the battery module 110a, where the safety CPU 120 (at the battery module 110a) may include a memory 121 to store the configuration 220. The memory 121 may be a flash or any suitable non-volatile memory. Additionally, the configuration 220 may be stored at a memory 161 of the BMS controller 160 (on the network side). The memory 161 may be a flash or any suitable non-volatile memory. In general, the configuration 220 may be stored at any memory on each battery module 110 and at a memory on the wBMS network manager 102. For instance, in some aspects, at the battery module 110, the configuration 220 can be stored at a memory (e.g., a flash) of a respective wireless node 140 or at a memory shared by the safety CPU 120 and the wireless node 140. In some aspects, at the wBMS network manager 102, the configuration 220 can be stored at a memory (e.g., a flash) of the wireless manager 150 or at a memory shared by the BMS controller 160 and the wireless manager 150.

In some examples, the serial ID 132 and/or the MAC ID 202 for each battery module 110 may be created at manufacturing. The configuration 220 may be created during assembly of the battery pack 192, where the serial ID 132 and/or the MAC ID 202 for each battery module 110 in the assembled battery pack 192 are read and the configuration 220 is generated. In some examples, during an initial set up or configuration of the wBMS 100 or 192, the configuration 220 may be stored at the memory 121 of each of the battery module 110 and at the memory 161 the wBMS network manager 102. In general, the configuration 220 may be generated and stored in any suitable ways and at any suitable time prior to the deployment of the wBMS 100 or 192.

While FIG. 2 illustrates the configuration 220 including both the BMIC serial ID list 222 and the MAC ID list 224, in some examples, the configuration 220 can omit the MAC ID list 224.

FIG. 3 is discussed in relation to FIGS. 1A-1B and 2. FIG. 3 illustrates an exemplary hardware ID-to-source ID mapping scheme 300 for provisioning a safety communication channel in a wBMS, according to some embodiments of the present disclosure. The scheme 300 may be implemented by the safety CPU 120 at a battery module 110 or by the BMS controller 160 at the wBMS network manager 102. As shown in FIG. 3, a mapping 310 may map each of the BMIC serial ID 132 in the list 222 (hardware ID list) to a different one of a plurality of source IDs 312. The mapping 310 may be a predetermined mapping. In the illustrated example of FIG. 3, the BMIC serial ID 132a (identifying the battery module 110a) may be mapped to a source ID 312a, the BMIC serial ID 132b (identifying the battery module 110b) may be mapped to a source ID 312b, the BMIC serial ID 132c (identifying the battery module 110c) may be mapped to a source ID 312c, and so on. As will be discussed more fully below, the source IDs 312 and corresponding BMIC serial ID 132 may be used for authenticating respective battery modules 110 for communications over respective safety communication channels (e.g., the safety communication channel 180). Accordingly, the predetermined mapping 310 may be known to each battery module 110 and the wBMS network manager 102.

In one aspect, the predetermined mapping 310 may be based on an order in which the BMIC serial IDs 132 are stored in the memory. Stated differently, each of the BMIC serial ID 132 may be mapped to a source ID 312 corresponding to the index referencing the location of the BMIC serial ID 132 in the list 222. Referring to the example shown in FIG. 2, the source ID 312a to which the BMIC serial ID 132a is mapped may have a value of 0 (based on index 0), the source ID 312b to which the BMIC serial ID 132b is mapped may have a value of 1 (based on index 1), and the source ID 312c to which the BMIC serial ID 132c is mapped may have a value of 2 (based on index 2), and so on.

In another aspect, the predetermined mapping 310 may be based on a hash function being applied to the BMIC serial IDs 132. That is, a hash function may be applied to the list 222 in which a hash key may be generated for each BMIC serial ID 132, and thus the hash key can be used as a source ID 312 for a respective BMIC serial ID 132. As an example, the applying of the hash function may generate hash keys 5, 9, and 7 for the BMIC serial ID 132a, 132b, and 132c, respectively. As such, the source ID 312a to which the BMIC serial ID 132a is mapped may have a value of 5, the source ID 312b to which the BMIC serial ID 132b is mapped may have a value of 9, and the source ID 312c to which the BMIC serial ID 132c is mapped may have a value of 7.

While FIG. 3 illustrates the generation of the source IDs 312 being based on the predetermined mapping 310 from the BMIC serial IDs 132, aspects are not limited thereto. For example, in an aspect, the source IDs 312 can be generated from memory states of respective battery module 110. In an example, each of the battery modules 110 may include a memory (e.g., static random-access memory (SRAM)), and an initial memory state of the memory may be used as a unique ID for identifying the respective battery module 110 from among other battery modules 110. In this case, the predetermined mapping 310 may map the initial memory state of each battery module 110 to a different one of the source IDs 312, where the mapping can be based on an order of the initial memory states are stored in a list (e.g., the list 222) or based on a hash function as discussed above.

Figure 4:
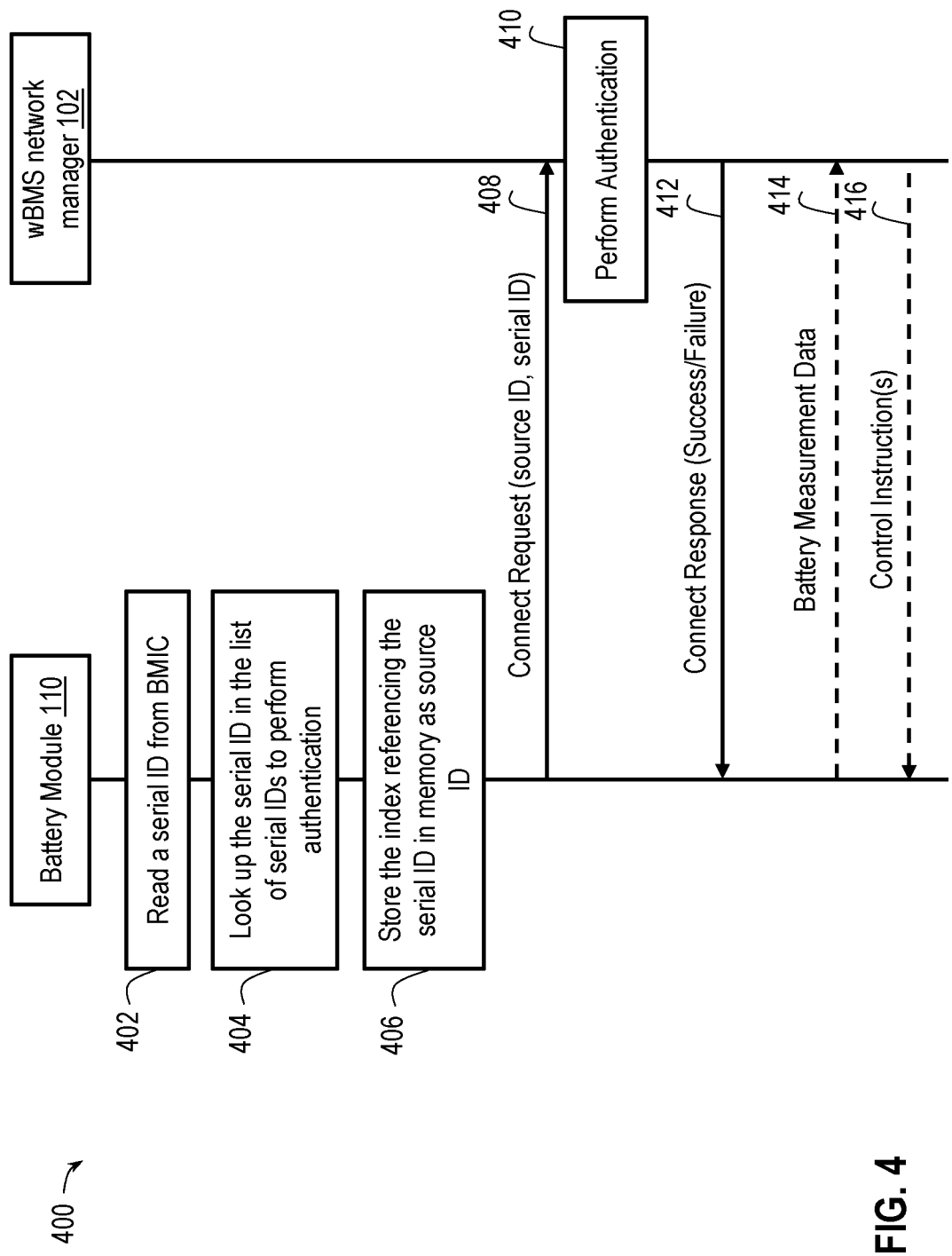
FIG. 4 is a sequence diagram of an exemplary method for establishing a safety communication channel in a wBMS, according to some embodiments of the present disclosure.

FIG. 4 is discussed in relation to FIGS. 1A-1B and 2-3. Further, FIGS. 4 and 5 are discussed in relation to each other to illustrate safety communication mechanisms. FIG. 4 is a sequence diagram of an exemplary method 400 for establishing a safety communication channel in a wBMS (e.g., the wMBS 100 and/or 190), according to some embodiments of the present disclosure. The method 400 may be implemented between a battery module 110 and a wBMS network manager 102 as discussed herein. In certain examples, the method 400 can be implemented by the safety CPU 120 at the battery module 110 and the BMS controller 160 at the wBMS network manager 102. Further, each of the battery module 110 and the wBMS network manager 102 may have a configuration 220 stored at a respective memory as discussed above with reference to FIG. 2 and may have knowledge about a predetermined mapping 310 as discussed above with reference to FIG. 3. Operations are illustrated once each and in a particular order in FIG. 4, but the operations may be performed in parallel, reordered, and/or repeated as desired. In an example, the battery module 110 and wBMS network manager 102 may perform the operations of the method 400 sequentially in time as shown. For simplicity, the method 400 may describe the authentication mechanisms using the order in which the BMIC serial IDs 132 are stored in the memory as source IDs 312. However, the method 400 may also be applied when the authentication mechanisms use the hash key for a BMIC serial ID 132 as a source ID 312.

At 402, the battery module 110 may read a serial ID 132 from a BMIC 130 at the battery module 110. In some examples, a safety CPU 120 at the battery module 110 may receive the serial ID 132 from the BMIC 130.

At 404, the battery module 110 may look up the serial ID 132 from a BMIC serial ID list 222 in a configuration 220 stored at a memory of the battery module 110. In some examples, the operations at 404 may be part of an authentication for authenticating the BMIC 130. For instance, the battery module 110 may determine whether the serial ID 132 of the BMIC 130 is one of the serial IDs in the configuration 220. If the serial ID 132 of the BMIC 130 is one of the serial IDs in the configuration 220, the authentication is a pass. If, however, the serial ID 132 of the BMIC 130 is not one of the serial IDs in the configuration 220, the authentication is a failure and the method 400 may terminate. In the illustrated example of FIG. 4, the authentication is a pass, and thus the battery module 110 may proceed to 406. In some examples, the operations at 404 may be performed by the safety CPU 120 or more specifically by the safety application 122.

At 406, the battery module 110 may store the index referencing the found serial ID in the list 222 as the source ID for establishing a safety communication channel 180 with the wBMS network manager 102.

At 408, the battery module 110 may transmit, and the wBMS network manager 102 may receive a connect request message or packet, for example, over a wireless communication channel 142 between the battery module 110 and the wBMS network manager 102. In some aspects, the safety CPU 120 at the battery module 110 may include an interface (e.g., the SPI 128) coupled to a wireless node 140 and may transmit the connect request packet via the interface and the wireless node 140. In a similar way, the BMS controller 160 may include an interface (e.g., the SPI 172) coupled to a wireless manager 150 and may receive the connect request packet via the interface and the wireless manager 150. The connect request packet may include the source ID obtained at 406 and the serial ID 132 obtained at 402. An example packet structure in which a connect request packet may be included is provided in FIG. 6.

At 410, upon receiving the connect request packet, the wBMS network manager 102 may perform authentication based on the source ID and the serial ID. Mechanisms for performing authentication are discussed below with reference to FIG. 5.

FIG. 5 is a flow diagram of an exemplary method 500 for authenticating a remote battery module in a wBMS for communication over a safety communication channel, according to some embodiments of the present disclosure. The method 500 can be implemented by the wBMS network manager 102 as part of operations at 410. In certain examples, the method 500 may be implemented by the BMS controller 160 at the wBMS network manager 102 or more specifically the safety application 162. Although the operations of the method 500 may be illustrated with reference to particular embodiments of the wBMS network manager 102 disclosed herein, the method 500 may be performed using any suitable hardware components and/or software components. Operations are illustrated once each and in a particular order in FIG. 5, but the operations may be performed in parallel, reordered, and/or repeated as desired.

At 502, the wBMS network manager 102 may receive a connect request packet, for example, from the battery module 110 as discussed above with reference to 408.

At 504, the wBMS network manager 102 may use the source ID in the received connect request packet to index into the BMIC serial ID list 222. In this regard, the wBMS network manager 102 may read, from the list 222, a BMIC serial ID referenced by the index (the received source ID). Stated differently, the wBMS network manager 102 may read a BMIC serial ID from a memory location that is referenced by the index (the received source ID).

At 506, the wBMS network manager 102 may compare the received BMIC serial ID (in the connect request packet) to the BMIC serial ID given in the location (the memory location or the location within the list 222) indexed by the source ID.

At 508, the wBMS network manager 102 may determine whether there is a match between the received BMIC serial ID and the BMIC serial ID in the list 222 indexed by the source ID. If there is a match, the wBMS network manager 102 may determine that the authentication is successful at 510. If, however, there is a mismatch, the wBMS network manager 102 may determine that the authentication is a failure at 512.

Returning to FIG. 4, at 412, the wBMS network manager 102 may transmit, and the battery module 110 may receive a connect response packet responsive to the connect request at 408. The wBMS network manager 102 may include an indication of a successful authentication in the connect response packet if the comparison at 506 is a match. Alternatively, the wBMS network manager 102 may include an indication of an authentication failure in the connect response packet if the comparison at 506 is a mismatch.

If the connect response is a success at 412, a safety communication channel 180 is established between the wBMS network manager 102 and the battery module 110. Upon establishing a safety communication channel, the wBMS network manager 102 and the battery module 110 may communicate with each other over the safety communication channel 180. For instance, at 414, the battery module 110 may transmit, and the wBMS network manager 102 may receive battery measurement data (e.g., voltages, current, temperatures, etc.) related to battery cells 112 at the battery module 110. The wBMS network manager 102 determine the health and/or performance of the battery cells 112 at the battery module 110 based on the received battery measurement data. In some examples, the wBMS network manager 102 may transmit, and the battery module 110 may receive one or more control instructions. In an example, the control instruction may instruct the battery module 110 to open a switch to disconnect certain battery cell(s) 112 at the battery module 110 or to disconnect the battery module 110 from a respective battery pack (e.g., the battery pack 192).

If, however, the connect response is a failure at 412, no safety communication channel is established, and thus the battery module 110 may not transfer safety data to the wBMS network manager 102.

In some aspects, the battery module 110 may transmit the connect request packet at 408 at power up when the safety CPU 120 is initialized. As an example, when the battery module 110 may be part of a battery pack (e.g., a battery pack 192) at a vehicle, the battery module 110 may transmit the connect request packet whenever the vehicle is turned on.

FIG. 6 illustrates an exemplary SCL protocol packet 600, according to some embodiments of the present disclosure. In some aspects, the connect request packet communicated at 408 and/or the connect response packet communicated at 412 may have a packet format as shown in FIG. 6. In some aspects, the battery measurement data communicated at 414 and/or the control instruction(s) communicated at 416 may have a packet format as shown in FIG. 6.

As shown in FIG. 6, the packet 600 may include an SCL header 602, a variable payload 604, and an SCL cyclic redundancy check (CRC) 606. The SCL header 602 may include a source ID field 608, a destination (Dent) ID field 610, a sequence (Seq) number field 612, a command ID field 614, and a payload length field 616. In some examples, each of the header fields may be an 8-bit field. In general, each of the header fields may include any suitable number of bits (e.g., 2, 3, 4, 6, 7 or more).

The source ID field 608 may indicate a source ID identifying a device or node that generated and/or transmitted the packet 600. For instance, the source ID may be mapped from a hardware ID such as a BMIC serial ID 132 or an initial memory state of a respective battery module 110 as discussed above with reference to FIG. 3. The destination ID field 610 may identify a destination device or node for receiving the packet 600. The sequence number field 612 may indicate a sequency number associated with the packet 600. For instance, the packet 600 may be an k-th packet within a sequence of packets, and thus the sequence number field 612 may indicate a value of k when the sequence index starts at 1. The command ID field 614 may indicate a command code for a BMIC (e.g., the BMIC 130). Some examples of commands may include, but are not limited to, a cell balancing request, a status update request, etc. The payload length field 616 may indicate a number of bytes in the variable payload 604. The SCL CRC 606 may indicate a CRC calculated over the SCL header 602 and the variable payload 604. In some examples, the SCL CRC 606 may be 24-bits long. In general, the SCL CRC 606 may have any suitable number of bits (e.g., 16, 32, etc.).

In an example, when the packet 600 is a connect request packet, the BMIC serial ID and the corresponding source ID of the battery module 110 may be included in the variable payload 604. Further, the payload 604 may include an indication of a connect request. In another example, when the packet 600 is a battery measurement packet, the battery measurement data (e.g., voltage, current, or temperature measured from the battery module 110) may be included in the variable payload 604. In a reverse direction, when the packet 600 is a control or command packet, the control instruction can include a command code in the command ID field 614 and can optionally include command data in the variable payload 604.

Figure 7:
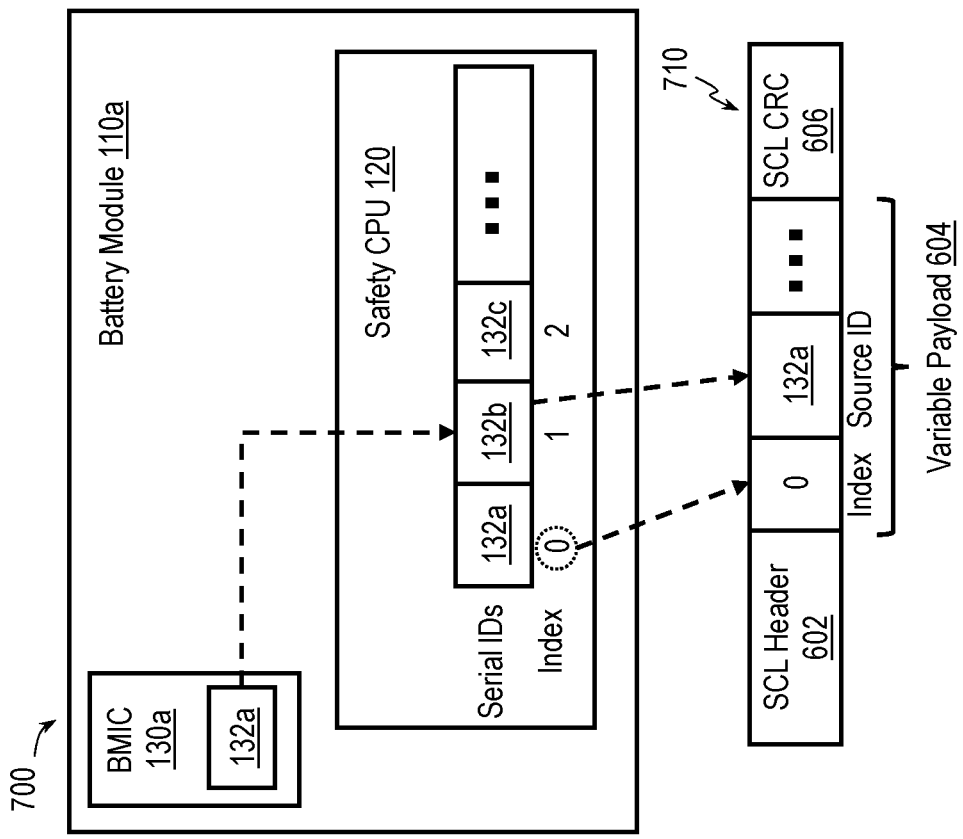
FIG. 7 illustrates an exemplary connect request packet generation scheme, according to some embodiments of the present disclosure.

FIG. 7 illustrates an exemplary connect request packet generation scheme 700, according to some embodiments of the present disclosure. The scheme 700 may be implemented by a battery module 110 and may use similar mechanism as discussed above with reference to FIGS. 1A-1B, 2-4, and 6 discussed above. In an aspect, the battery module 110 may generate the connect request packet transmitted at 408 using the scheme 700. For simplicity of discussion, the scheme 700 may be discussed in the context of the battery module 110a of FIG. 1B and FIG. 2.

As shown in FIG. 7, the battery module 110a may read a BMIC serial ID 132a from a BMIC 130a at the battery module 110a. The battery module 110a may look up a list (e.g., the list 222) of serial IDs 132 (shown as 132a, 132b, 132c, ...) stored at a safety CPU 120 of the battery module 110a. The list may be part of a configuration 220 as discussed above with reference to FIG. 2. In the illustrated example shown in FIG. 7, the BMIC serial ID 132a is referenced by an index of 0 (which may be used as a source ID). Accordingly, the battery module 110 may construct an SCL packet 710 having a format as shown in FIG. 6, where the source ID of 0 and the BMIC serial ID 132a are carried in the variable payload 604 of the SCL packet 710.

Figure 8:
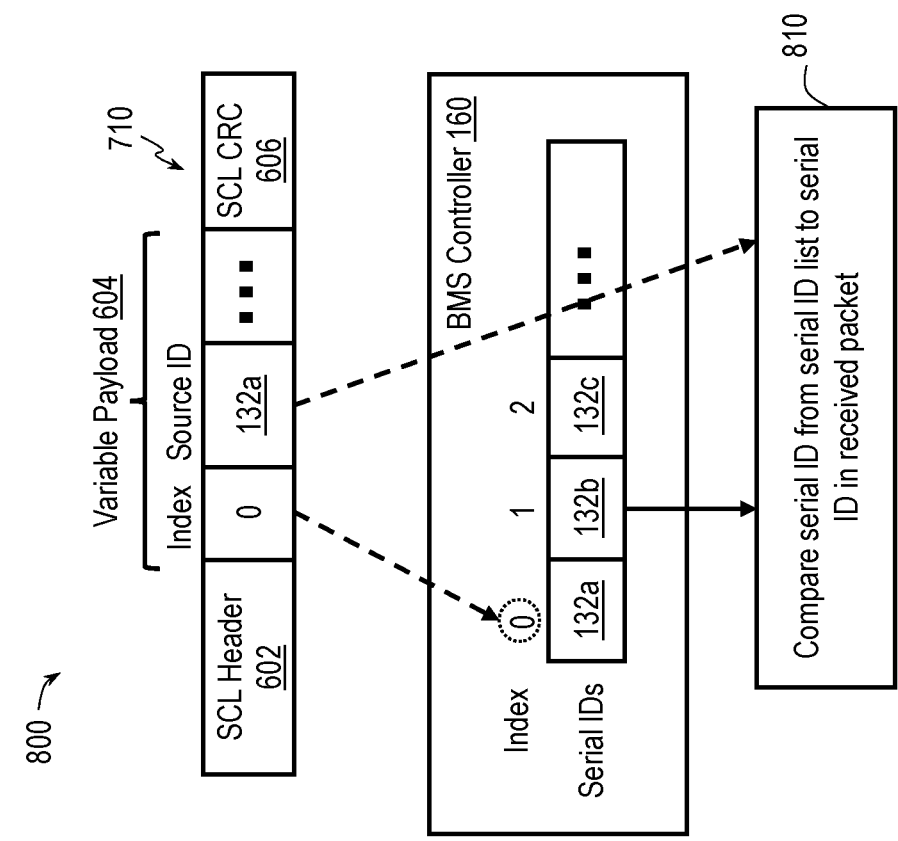
FIG. 8 illustrates an exemplary authentication scheme for establishing a safety communication channel in a wBMS, according to some embodiments of the present disclosure.

FIG. 8 illustrates an exemplary authentication scheme 800 for establishing a safety communication channel in a wBMS, according to some embodiments of the present disclosure. The scheme 800 may be implemented by the wBMS network manager 102 and may use similar mechanisms as discussed above with reference to FIGS. 1A-1B and 2-6 discussed above. In an aspect, the wBMS network manager 102 may perform authentication at 410 using the scheme 800.

As shown in FIG. 8, the wBMS network manager 102 may receive the connect request packet 710 from the battery module 110a. Upon receiving the packet 710, the BMS controller 160 may use the index 0 (in the payload 604) to index into a list 222 of BMIC serial IDs 132 stored at the BMS controller 160. The list may be part of a configuration 220 as discussed above with reference to FIG. 2. The wBMS network manager 102 may read, from the list 222, a BMIC serial ID referenced by index 0. In the illustrated example of FIG. 8, the BMIC serial ID referenced by the index 0 is 132a.

At 810, the wBMS network manager 102 may compare the serial ID obtained from the serial ID list 222 to the serial ID in the received packet 710. In the illustrated example of FIG. 8, the serial ID obtained from the serial ID list matches the serial ID in the received packet 710. Accordingly, the wBMS network manager 102 may determine that the authentication is a pass or success.

Figure 9:
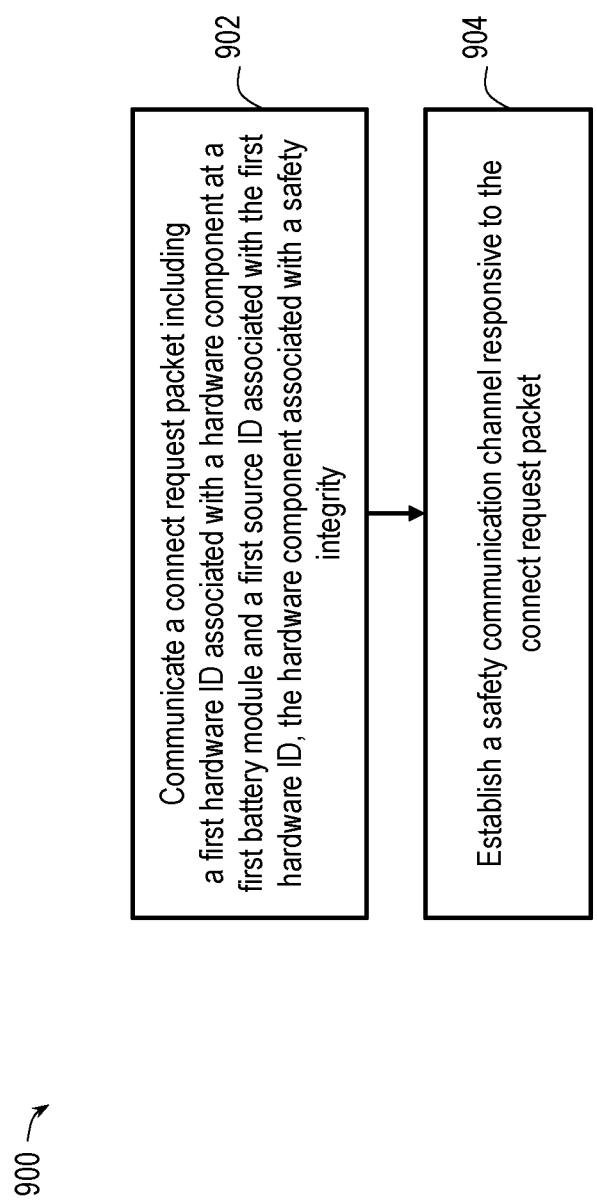
FIG. 9 is a flow diagram of an exemplary method for communicating in a wBMS, according to some embodiments of the present disclosure.

FIG. 9 is a flow diagram of an exemplary method 900 for communicating in a wBMS (e.g., the wBMS 100 of FIG. 1 and the wBMS 190 of FIG. 1), according to some embodiments of the present disclosure. In one aspect, the method 900 can be implemented by a wBMS network manager 102 as discussed herein. In another aspect, the method 900 can be implemented by a battery module 110 as discussed herein. The wBMS network manager 102 and/or the battery module 110 may be referred to as a wireless communication device. The method 900 may use similar mechanisms as discussed above with reference to FIGS. 1A-1B and 2-8. Although the operations of the method 900 may be illustrated with reference to particular embodiments of the wBMS network manager 102 or a battery module 110 disclosed herein, the method 900 may be performed using any suitable hardware components and/or software components. Operations are illustrated once each and in a particular order in FIG. 9, but the operations may be performed in parallel, reordered, and/or repeated as desired.

At 902, a first wireless communication device may communicate a connect request packet with a second wireless communication device in wBMS. The connect request packet may include a first hardware ID of a hardware component at a first battery module and a first source ID associated with the first hardware ID. The hardware component may be associated with a safety integrity (e.g., a certain safety integrity level or passed a safety integrity compliance check according to the ISO 61784-3 and/or ISO 26262). In some examples, the connect request packet may have a packet format as shown in FIGS. 6-8.

In one aspect, the first wireless communication device may correspond to the first battery module (e.g., a battery module 110), the second wireless communication device may correspond to a wBMS network manager (e.g., the wBMS network manager 102) of the wBMS, and the communicating the packet may include transmitting, to the second wireless communication device, the connect request packet. In another aspect, the first wireless communication device may correspond to a network manager (e.g., the wBMS network manager 102) of the battery management system, the second wireless communication device may correspond to the first battery module (e.g., a battery module 110), and the communicating the packet may include receiving, from the second wireless communication device, the connect request packet.

At 904, the first wireless communication device may establish a safety communication channel (e.g., the safety communication channel 180) with the second wireless communication device responsive to the connect request packet.

In some aspects, the first hardware ID may be one of a plurality of hardware IDs in a list. The first source ID may be one of a plurality of source IDs. Each of the plurality of hardware IDs in the list is mapped to one of the plurality of source IDs according to a position of the hardware ID of each of the plurality of battery modules within the list, for example as discussed above with reference to FIG. 3.

In some aspects, when the first wireless communication device corresponds to the first battery module, the first wireless communication device may further obtain the first hardware ID that identifies the hardware component. In an example, the hardware component may correspond to a BMIC (e.g., a BMIC 130) at the first battery module, and the first hardware ID may correspond to a serial ID (e.g., the serial ID 132) of the BMIC. In another example, the hardware component may correspond to a memory (e.g., a memory 121) at the first battery module, and the first hardware ID may correspond to an initial memory state of the memory. Further, the first wireless communication device may determine the first source ID based on the first hardware ID and a predetermined mapping, for example, as discussed above with reference to FIGS. 3-4 and 7.

In some aspects, when the first wireless communication device corresponds to the wBMS network manager, the first wireless communication device may further search for a second hardware ID from a list of hardware IDs using the first source ID in the received packet and a predetermined mapping. The first wireless communication device may further perform authentication by comparing the first hardware ID in the received packet to the second hardware ID from the list, for example, as discussed above with reference to FIGS. 4-5 and 8. In a further aspect, as part of establishing the safety communication channel at 904, the first wireless communication device may transmit, to the second wireless communication device, an indication of a successful authentication based on a match between the first hardware ID in the received packet and the second hardware ID from the list. Conversely, the first wireless communication device may transmit, to the second wireless communication device, an indication of a authentication failure based on a mismatch between the first hardware ID in the received packet and the second hardware ID from the list. In an example, the first wireless communication device may perform authentication using the method 500 discussed above with reference to FIG. 5.

In some aspects, the first wireless communication device may further communicate, with the second wireless communication device via the safety communication channel, another packet having a packet header including an indication of the first source ID and a payload including at least one of battery measurement data (e.g., voltage, current, or temperature) or a battery module control instruction. In an aspect, when the first wireless communication device corresponds to the wBMS network manager, the battery measurement data may be measurements of the second wireless communication device, and the first wireless communication device may receive the battery measurement data from the second wireless communication device. In an aspect, when the first wireless communication device corresponds to the wBMS network manager, the first wireless communication device may transmit the control instruction to the second wireless communication device. In an aspect, when the first wireless communication device corresponds to the first battery module, the battery measurement data may be measurements of the first battery module, and the first wireless communication device may transmit the battery measurement data to the second wireless communication device. In an aspect, when the first wireless communication device corresponds to the first battery module, the first wireless communication device may receive the control instruction from the second wireless communication device.

Figure 10:
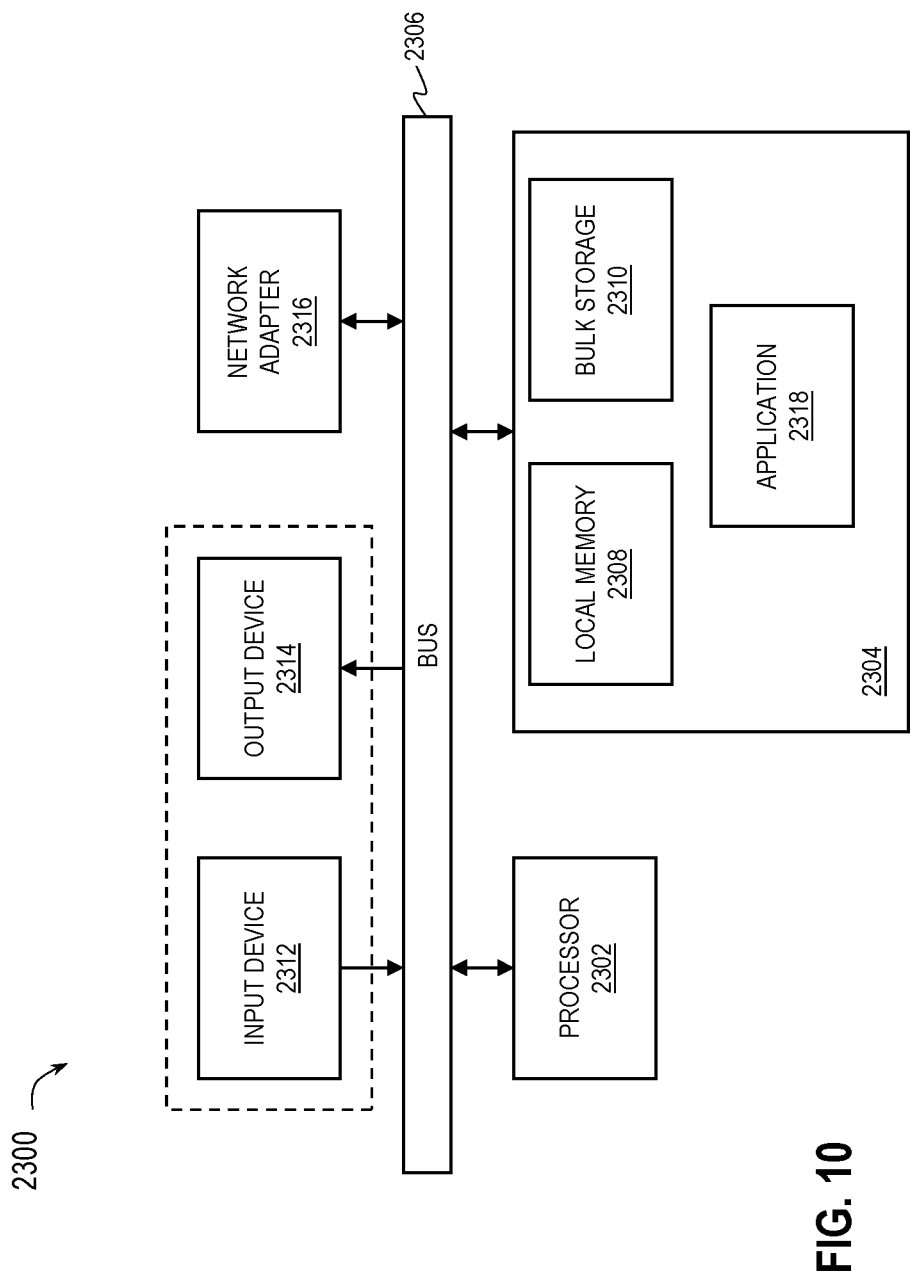
FIG. 10 is a block diagram illustrating an exemplary data processing system, according to some embodiments of the present disclosure.

FIG. 10 is a block diagram illustrating an exemplary data processing system 2300 that may be configured to implement, or control at least a portion of the battery module 110 or the wBMS network manager 102 discussed herein, according to some embodiments of the present disclosure.

As shown in FIG. 10, the data processing system 2300 may include at least one processor 2302, e.g., a hardware processor 2302, coupled to memory elements 2304 through a system bus 2306. As such, the data processing system may store program code within memory elements 2304. Further, the processor 2302 may execute the program code accessed from the memory elements 2304 via a system bus 2306. In one aspect, the data processing system may be implemented as a computer that is suitable for storing and/or executing program code. It should be appreciated, however, that the data processing system 2300 may be implemented in the form of any system including a processor and a memory that is capable of performing the functions described within this disclosure.

In some embodiments, the processor 2302 can execute software or an algorithm to perform the activities as discussed in the present disclosure, in particular activities related to performing authentication to establish a safety communication channel as described herein. The processor 2302 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 2302 may be communicatively coupled to the memory element 2304, for example in a direct-memory access (DMA) configuration, so that the processor 2302 may read from or write to the memory elements 2304.

In general, the memory elements 2304 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 2300 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor."

In certain example implementations, mechanisms for performing authentication performing authentication to establish a safety communication channel as discussed herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 2304 shown in FIG. 10, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processor 2302 shown in FIG. 10, could transform an element or an article (e.g., data) from one state or thing to another state or thing. In another example, the activities outlined herein may be implemented with fixed logic or programmable logic (e.g., software/ computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 2304 may include one or more physical memory devices such as, for example, local memory 2308 and one or more bulk storage devices 2310. The local memory may refer to RAM or other non-persistent memory device(s) generally used during actual execution of the program code. A bulk storage device may be implemented as a hard drive or other persistent data storage device. The processing system 2300 may also include one or more cache memories (not shown) that provide temporary storage of at least some program code in order to reduce the number of times program code must be retrieved from the bulk storage device 2310 during execution.

As shown in FIG. 10, the memory elements 2304 may store an application 2318. In various embodiments, the application 2318 may be stored in the local memory 2308, the one or more bulk storage devices 2310, or apart from the local memory and the bulk storage devices. It should be appreciated that the data processing system 2300 may further execute an operating system (not shown in FIG. 10) that can facilitate execution of the application 2318. The application 2318, being implemented in the form of executable program code, can be executed by the data processing system 2300, e.g., by the processor 2302. Responsive to executing the application, the data processing system 2300 may be configured to perform one or more operations or method steps described herein.

Input/output (I/O) devices depicted as an input device 2312 and an output device 2314, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 2314 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 2314. Input devices 2312 and/or output devices 2314 may be coupled to the data processing system either directly or through intervening I/O controllers.

In an embodiment, the input and the output devices may be implemented as a combined input/output device (illustrated in FIG. 10 with a dashed line surrounding the input device 2312 and the output device 2314). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

A network adapter 2316 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 2300, and a data transmitter for transmitting data from the data processing system 2300 to said systems, devices and/or networks. Modems, cable modems, and Ethernet cards are examples of different types of network adapter that may be used with the data processing system 2300.

Figure 11:
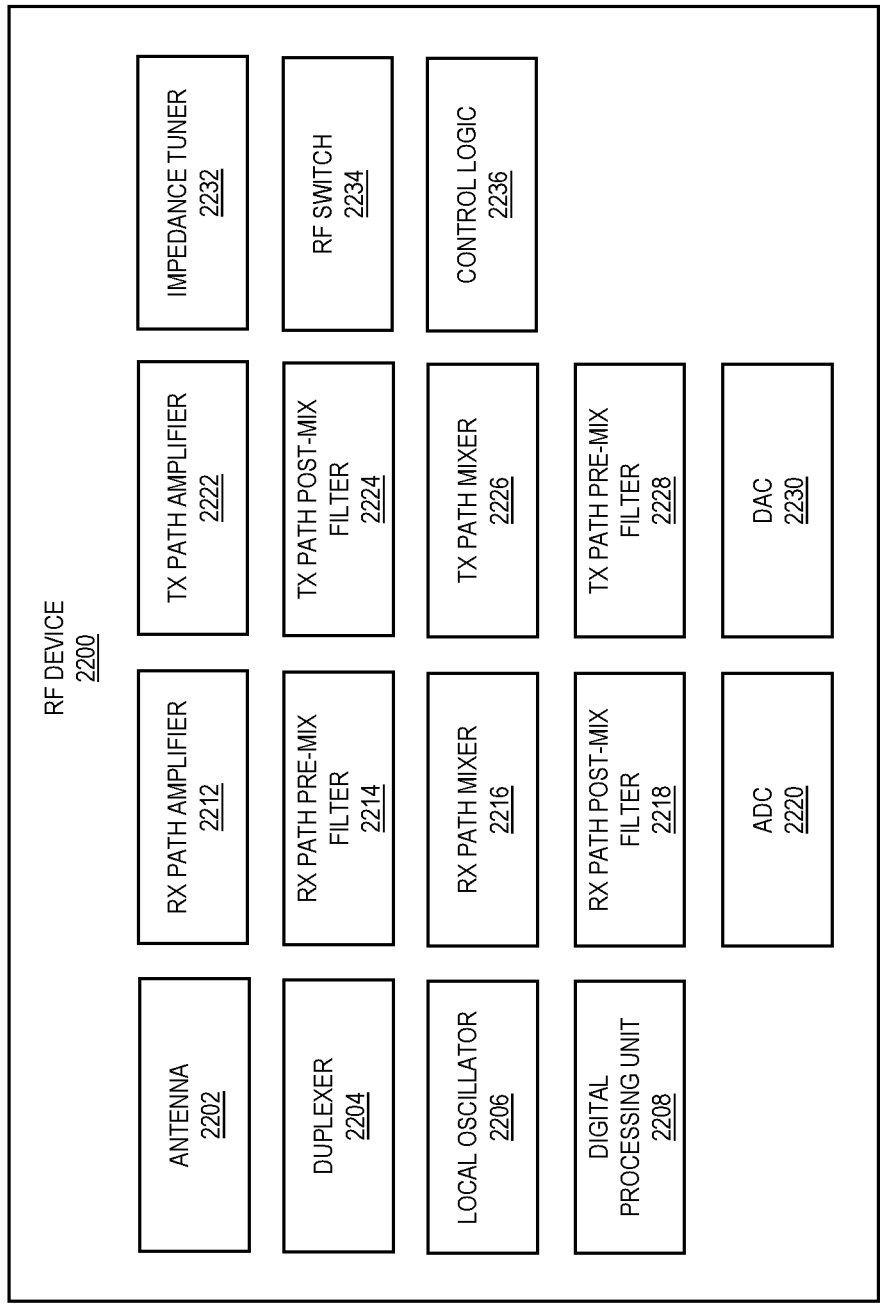
FIG. 11 is a schematic block diagram illustrating an exemplary radio frequency (RF) device, according to some embodiments of the present disclosure.

FIG. 11 is a schematic block diagram illustrating an exemplary RF device 2200, e.g., a wireless transceiver, a wireless node 140, and/or a wireless manager 150 as discussed herein may be implemented, according to some embodiments of the present disclosure.

In general, the RF device 2200 may be any device or system that may support wireless transmission and/or reception of signals in the form of electromagnetic waves in the RF range of approximately 3 kilohertz (kHz) to approximately 300 Gigahertz (GHz). In some embodiments, the RF device 2200 may be used for wireless communications, e.g., in a base station (BS) or a user equipment (UE) device of any suitable cellular wireless communications technology, such as GSM, WCDMA, or long term evolution (LTE). In a further example, the RF device 2200 may be used as, or in, e.g., a BS, an RRH, or a UE device of a millimeter-wave wireless technology such as fifth generation (5G) wireless (i.e., high-frequency/short wavelength spectrum, e.g., with frequencies in the range between about 20 and 60 GHz, corresponding to wavelengths in the range between about 5 and 15 millimeters). In yet another example, the RF device 2200 may be used for wireless communications using Wi-Fi technology (e.g., a frequency band of 2.4 GHz, corresponding to a wavelength of about 12 cm, or a frequency band of 5.8 GHz, spectrum, corresponding to a wavelength of about 5 cm), e.g., in a Wi-Fi-enabled device such as a desktop, a laptop, a video game console, a smart phone, a tablet, a smart TV, a digital audio player, a car, a printer, etc. In some implementations, a Wi-Fi-enabled device may, e.g., be a node in a smart system configured to communicate data with other nodes, e.g., a smart sensor. Still in another example, the RF device 2200 may be used for wireless communications using Bluetooth technology (e.g., a frequency band from about 2.4 to about 2.485 GHz, corresponding to a wavelength of about 12 cm). In other embodiments, the RF device 2200 may be used for transmitting and/or receiving RF signals for purposes other than communication, e.g., in an automotive radar system, or in medical applications such as magneto-resonance imaging (MRI).

In various embodiments, the RF device 2200 may be included in frequency-division duplex (FDD) or time-domain duplex (TDD) variants of frequency allocations that may be used in a cellular network. In an FDD system, the uplink (i.e., RF signals transmitted from the UE devices to a BS) and the downlink (i.e., RF signals transmitted from the BS to the US devices) may use separate frequency bands at the same time. In a TDD system, the uplink and the downlink may use the same frequencies but at different times.

Several components are illustrated in FIG. 11 as included in the RF device 2200, but any one or more of these components may be omitted or duplicated, as suitable for the application. For example, in some embodiments, the RF device 2200 may be an RF device supporting both of wireless transmission and reception of RF signals (e.g., an RF transceiver), in which case it may include both the components of what is referred to herein as a transmit (TX) path and the components of what is referred to herein as a receive (RX) path. However, in other embodiments, the RF device 2200 may be an RF device supporting only wireless reception (e.g., an RF receiver), in which case it may include the components of the RX path, but not the components of the TX path; or the RF device 2200 may be an RF device supporting only wireless transmission (e.g., an RF transmitter), in which case it may include the components of the TX path, but not the components of the RX path.

In some embodiments, some or all the components included in the RF device 2200 may be attached to one or more motherboards. In some embodiments, some or all these components are fabricated on a single die, e.g., on a single system on chip (SoC) die.

Additionally, in various embodiments, the RF device 2200 may not include one or more of the components illustrated in FIG. 11, but the RF device 2200 may include interface circuitry for coupling to the one or more components. For example, the RF device 2200 may not include an antenna 2202, but may include antenna interface circuitry (e.g., a matching circuitry, a connector and driver circuitry) to which an antenna 2202 may be coupled. In another set of examples, the RF device 2200 may not include a digital processing unit 2208 or a local oscillator 2206, but may include device interface circuitry (e.g., connectors and supporting circuitry) to which a digital processing unit 2208 or a local oscillator 2206 may be coupled.

As shown in FIG. 11, the RF device 2200 may include an antenna 2202, a duplexer 2204 (e.g., if the RF device 2200 is an FDD RF device; otherwise the duplexer 2204 may be omitted), a local oscillator 2206, a digital processing unit 2208. As also shown in FIG. 11, the RF device 2200 may include an RX path that may include an RX path amplifier 2212, an RX path pre-mix filter 2214, a RX path mixer 2216, an RX path post-mix filter 2218, and an analog-to-digital converter (ADC) 2220. As further shown in FIG. 11, the RF device 2200 may include a TX path that may include a TX path amplifier 2222, a TX path post-mix filter 2224, a TX path mixer 2226, a TX path pre-mix filter 2228, and a digital-to-analog converter (DAC) 2230. Still further, the RF device 2200 may further include an impedance tuner 2232, an RF switch 2234, and control logic 2236. In various embodiments, the RF device 2200 may include multiple instances of any of the components shown in FIG. 11. In some embodiments, the RX path amplifier 2212, the TX path amplifier 2222, the duplexer 2204, and the RF switch 2234 may be considered to form, or be a part of, an RF front-end (FE) of the RF device 2200. In some embodiments, the RX path amplifier 2212, the TX path amplifier 2222, the duplexer 2204, and the RF switch 2234 may be considered to form, or be a part of, an RF FE of the RF device 2200. In some embodiments, the RX path mixer 2216 and the TX path mixer 2226 (possibly with their associated pre-mix and post-mix filters shown in FIG. 11) may be considered to form, or be a part of, an RF transceiver of the RF device 2200 (or of an RF receiver or an RF transmitter if only RX path or TX path components, respectively, are included in the RF device 2200). In some embodiments, the RF device 2200 may further include one or more control logic elements/circuits, shown in FIG. 11 as control logic 2236, e.g., an RF FE control interface. In some embodiments, the control logic 2236 may be used to control other functions within the RF device 2200, e.g., enhance control of complex RF system environment, support implementation of envelope tracking techniques, reduce dissipated power, etc.

The antenna 2202 may be configured to wirelessly transmit and/or receive RF signals in accordance with any wireless standards or protocols, e.g., Wi-Fi, LTE, or GSM, as well as any other wireless protocols that are designated as 3G, 4G, 5G, and beyond. If the RF device 2200 is an FDD transceiver, the antenna 2202 may be configured for concurrent reception and transmission of communication signals in separate, i.e., non-overlapping and non-continuous, bands of frequencies, e.g., in bands having a separation of, e.g., 20 MHz from one another. If the RF device 2200 is a TDD transceiver, the antenna 2202 may be configured for sequential reception and transmission of communication signals in bands of frequencies that may be the same or overlapping for TX and RX paths. In some embodiments, the RF device 2200 may be a multi-band RF device, in which case the antenna 2202 may be configured for concurrent reception of signals having multiple RF components in separate frequency bands and/or configured for concurrent transmission of signals having multiple RF components in separate frequency bands. In such embodiments, the antenna 2202 may be a single wide-band antenna or a plurality of band-specific antennas (i.e., a plurality of antennas each configured to receive and/or transmit signals in a specific band of frequencies). In various embodiments, the antenna 2202 may include a plurality of antenna elements, e.g., a plurality of antenna elements forming a phased antenna array (i.e., a communication system or an array of antennas that may use a plurality of antenna elements and phase shifting to transmit and receive RF signals). Compared to a single-antenna system, a phased antenna array may offer advantages such as increased gain, ability of directional steering, and simultaneous communication. In some embodiments, the RF device 2200 may include more than one antenna 2202 to implement antenna diversity. In some such embodiments, the RF switch 2234 may be deployed to switch between different antennas.

An output of the antenna 2202 may be coupled to the input of the duplexer 2204. The duplexer 2204 may be any suitable component configured for filtering multiple signals to allow for bidirectional communication over a single path between the duplexer 2204 and the antenna 2202. The duplexer 2204 may be configured for providing RX signals to the RX path of the RF device 2200 and for receiving TX signals from the TX path of the RF device 2200.

The RF device 2200 may include one or more local oscillators 2206, configured to provide local oscillator signals that may be used for downconversion of the RF signals received by the antenna 2202 and/or upconversion of the signals to be transmitted by the antenna 2202.

The RF device 2200 may include the digital processing unit 2208, which may include one or more processing devices. The digital processing unit 2208 may be configured to perform various functions related to digital processing of the RX and/or TX signals. Examples of such functions include, but are not limited to, decimation/downsampling, error correction, digital downconversion or upconversion, DC offset cancellation, automatic gain control, etc. Although not shown in FIG. 11, in some embodiments, the RF device 2200 may further include a memory device, configured to cooperate with the digital processing unit 2208.

Turning to the details of the RX path that may be included in the RF device 2200, the RX path amplifier 2212 may include a low-noise amplifier (LNA). An input of the RX path amplifier 2212 may be coupled to an antenna port (not shown) of the antenna 2202, e.g., via the duplexer 2204. The RX path amplifier 2212 may amplify the RF signals received by the antenna 2202.

An output of the RX path amplifier 2212 may be coupled to an input of the RX path pre-mix filter 2214, which may be a harmonic or band-pass (e.g., low-pass) filter, configured to filter received RF signals that have been amplified by the RX path amplifier 2212.

An output of the RX path pre-mix filter 2214 may be coupled to an input of the RX path mixer 2216, also referred to as a downconverter. The RX path mixer 2216 may include two inputs and one output. A first input may be configured to receive the RX signals, which may be current signals, indicative of the signals received by the antenna 2202 (e.g., the first input may receive the output of the RX path pre-mix filter 2214). A second input may be configured to receive local oscillator signals from one of the local oscillators 2206. The RX path mixer 2216 may then mix the signals received at its two inputs to generate a downconverted RX signal, provided at an output of the RX path mixer 2216. As used herein, downconversion refers to a process of mixing a received RF signal with a local oscillator signal to generate a signal of a lower frequency. In particular, the TX path mixer (e.g., downconverter) 2216 may be configured to generate the sum and/or the difference frequency at the output port when two input frequencies are provided at the two input ports. In some embodiments, the RF device 2200 may implement a direct-conversion receiver (DCR), also known as homodyne, synchrodyne, or zero-IF receiver, in which case the RX path mixer 2216 may be configured to demodulate the incoming radio signals using local oscillator signals whose frequency is identical to, or very close to the carrier frequency of the radio signal. In other embodiments, the RF device 2200 may make use of downconversion to an intermediate frequency (IF). IFs may be used in superheterodyne radio receivers, in which a received RF signal is shifted to an IF before the final detection of the information in the received signal is done. Conversion to an IF may be useful for several reasons. For example, when several stages of filters are used, they can all be set to a fixed frequency, which makes them easier to build and to tune. In some embodiments, the RX path mixer 2216 may include several such stages of IF conversion.

Although a single RX path mixer 2216 is shown in the RX path of FIG. 11, in some embodiments, the RX path mixer 2216 may be implemented as a quadrature downconverter, in which case it would include a first RX path mixer and a second RX path mixer. The first RX path mixer may be configured for performing downconversion to generate an in-phase (I) downconverted RX signal by mixing the RX signal received by the antenna 2202 and an in-phase component of the local oscillator signal provided by the local oscillator 2206. The second RX path mixer may be configured for performing downconversion to generate a quadrature (Q) downconverted RX signal by mixing the RX signal received by the antenna 2202 and a quadrature component of the local oscillator signal provided by the local oscillator 2206 (the quadrature component is a component that is offset, in phase, from the in-phase component of the local oscillator signal by 90 degrees). The output of the first RX path mixer may be provided to a I-signal path, and the output of the second RX path mixer may be provided to a Q-signal path, which may be substantially 90 degrees out of phase with the I-signal path.

The output of the RX path mixer 2216 may, optionally, be coupled to the RX path post-mix filter 2218, which may be low-pass filters. In case the RX path mixer 2216 is a quadrature mixer that implements the first and second mixers as described above, the in-phase and quadrature components provided at the outputs of the first and second mixers respectively may be coupled to respective individual first and second RX path post-mix filters included in the filter 2218.

The ADC 2220 may be configured to convert the mixed RX signals from the RX path mixer 2216 from analog to digital domain. The ADC 2220 may be a quadrature ADC that, like the RX path quadrature mixer 2216, may include two ADCs, configured to digitize the downconverted RX path signals separated in in-phase and quadrature components. The output of the ADC 2220 may be provided to the digital processing unit 2208, configured to perform various functions related to digital processing of the RX signals so that information encoded in the RX signals can be extracted.

Turning to the details of the TX path that may be included in the RF device 2200, the digital signal to later be transmitted (TX signal) by the antenna 2202 may be provided, from the digital processing unit 2208, to the DAC 2230. Like the ADC 2220, the DAC 2230 may include two DACs, configured to convert, respectively, digital I- and Q-path TX signal components to analog form.

Optionally, the output of the DAC 2230 may be coupled to the TX path pre-mix filter 2228, which may be a band-pass (e.g., low-pass) filter (or a pair of band-pass, e.g., low-pass, filters, in case of quadrature processing) configured to filter out, from the analog TX signals output by the DAC 2230, the signal components outside of the desired band. The digital TX signals may then be provided to the TX path mixer 2226, which may also be referred to as an upconverter. Like the RX path mixer 2216, the TX path mixer 2226 may include a pair of TX path mixers, for in-phase and quadrature component mixing. Like the first and second RX path mixers that may be included in the RX path, each of the TX path mixers of the TX path mixer 2226 may include two inputs and one output. A first input may receive the TX signal components, converted to the analog form by the respective DAC 2230, which are to be upconverted to generate RF signals to be transmitted. The first TX path mixer may generate an in-phase (I) upconverted signal by mixing the TX signal component converted to analog form by the DAC 2230 with the in-phase component of the TX path local oscillator signal provided from the local oscillator 2206 (in various embodiments, the local oscillator 2206 may include a plurality of different local oscillators, or be configured to provide different local oscillator frequencies for the mixer 2216 in the RX path and the mixer 2226 in the TX path). The second TX path mixer may generate a quadrature phase (Q) upconverted signal by mixing the TX signal component converted to analog form by the DAC 2230 with the quadrature component of the TX path local oscillator signal. The output of the second TX path mixer may be added to the output of the first TX path mixer to create a real RF signal. A second input of each of the TX path mixers may be coupled the local oscillator 2206.

Optionally, the RF device 2200 may include the TX path post-mix filter 2224, configured to filter the output of the TX path mixer 2226.

In various embodiments, any of the RX path pre-mix filter 2214, the RX path post-mix filter 2218, the TX post-mix filter 2224, and the TX pre-mix filter 2228 may be implemented as RF filters. In some embodiments, an RF filter may be implemented as a plurality of RF filters, or a filter bank. A filter bank may include a plurality of RF filters that may be coupled to a switch, e. g., the RF switch 2234, configured to selectively switch any one of the plurality of RF filters on and off (e.g., activate any one of the plurality of RF filters), in order to achieve desired filtering characteristics of the filter bank (i.e., in order to program the filter bank). For example, such a filter bank may be used to switch between different RF frequency ranges when the RF device 2200 is, or is included in, a BS or in a UE device. In another example, such a filter bank may be programmable to suppress TX leakage on the different duplex distances.

The impedance tuner 2232 may include any suitable circuitry, configured to match the input and output impedances of the different RF circuitries to minimize signal losses in the RF device 2200. For example, the impedance tuner 2232 may include an antenna impedance tuner. Being able to tune the impedance of the antenna 2202 may be particularly advantageous because antenna's impedance is a function of the environment that the RF device 2200 is in, e.g., antenna's impedance changes depending on, e.g., if the antenna is held in a hand, placed on a car roof, etc.

As described above, the RF switch 2234 may be a device configured to route high-frequency signals through transmission paths, e.g., in order to selectively switch between a plurality of instances of any one of the components shown in FIG. 11, e.g., to achieve desired behavior and characteristics of the RF device 2200. For example, in some embodiments, an RF switch may be used to switch between different antennas 2202. In other embodiments, an RF switch may be used to switch between a plurality of RF filters (e.g., by selectively switching RF filters on and off) of the RF device 2200. Typically, an RF system would include a plurality of such RF switches.

The RF device 2200 provides a simplified version and, in further embodiments, other components not specifically shown in FIG. 11 may be included. For example, the RX path of the RF device 2200 may include a current-to-voltage amplifier between the RX path mixer 2216 and the ADC 2220, which may be configured to amplify and convert the downconverted signals to voltage signals. In another example, the RX path of the RF device 2200 may include a balun transformer for generating balanced signals. In yet another example, the RF device 2200 may further include a clock generator, which may, e.g., include a suitable phased-lock loop (PLL), configured to receive a reference clock signal and use it to generate a different clock signal that may then be used for timing the operation of the ADC 2220, the DAC 2230, and/or that may also be used by the local oscillator 2206 to generate the local oscillator signals to be used in the RX path or the TX path. In general, RF device 2200 may include clock generation circuitries or PLL in various domains such as in a RF domain, a digital I/O domain (e.g., for communications with devices outside of the RF device), clock domain, etc.

EXAMPLES

Example 1 include a wireless battery management system (wBMS) network manager, including a memory to store a list of hardware identifiers (IDs), where each hardware ID in the list is associated with a respective one of a plurality of battery modules; and mapped, based on a predetermined mapping, to a different one of a plurality of source IDs; an interface to receive, from a remote battery module over a wireless communication channel, a packet including a source ID and a hardware ID associated with the remote battery module; and one or more processing units to search, using the source ID in the received packet and the predetermined mapping, for a first hardware ID from the list of hardware IDs; and authenticating the remote battery module based on a comparison of the hardware ID in the received packet to the first hardware ID from the list.

In Example 2, the wBMS network manager of example 1 can optionally include where the predetermined mapping is based on an order of the hardware IDs in the list; and the one or more processing units searches for the first hardware ID from the list by using the source ID in the received packet as an index into the list of hardware IDs.

In Example 3, the wBMS network manager of any of examples 1-2 can optionally include where the predetermined mapping is based on a hash function; and the one or more processing units searches for the first hardware ID from the list by applying the hash function to the list of hardware IDs.

In Example 4, the wBMS network manager of any of examples 1-3 can optionally include where the received packet includes an indication of a connect request.

In Example 5, the wBMS network manager of any of examples 1~4 can optionally include where the one or more processing units further transmits, over the wireless communication channel via the interface, an indication of a successful authentication based on a match between the hardware ID in the received packet and the first hardware ID from the list.

In Example 6, the wBMS network manager of any of examples 1~4 can optionally include where the one or more processing units further transmits, over the wireless communication channel via the interface, an indication of an authentication failure based on a mismatch between the hardware ID in the received packet and the first hardware ID from the list.

In Example 7, the wBMS network manager of any of examples 1-6 can optionally include where an individual hardware ID in the list of hardware IDs identifies a hardware component of a respective battery module of the plurality of battery modules, the hardware component associated with a safety integrity level.

In Example 8, the wBMS network manager of any of examples 1-7 can optionally include where the hardware component of the respective battery module is associated with a safety integrity level.

In Example 9, the wBMS network manager of any of examples 1-8 can optionally include where an individual hardware ID in the list of hardware IDs is a serial ID of a battery monitor at a respective battery module of the plurality of battery modules.

In Example 10, the wBMS network manager of any of examples 1-9 can optionally include where the memory further stores a list of media access control (MAC) IDs, each associated with a wireless transceiver of a respective battery module of the plurality of battery modules; a serial ID associated with an individual battery module of the plurality of battery modules in the list of hardware IDs is referenced by a first index; and a MAC ID associated with the individual battery module in the list of MAC IDs is referenced by a second index, the second index being the same as the first index.

In Example 11, the wBMS network manager of any of examples 1-10 can optionally include where an individual hardware ID in the list of hardware IDs is associated with a memory state of a respective battery module of the plurality of battery modules.

In Example 12, the wBMS network manager of any of examples 1-11 can optionally include where the one or more processing units further receives, from the remote battery module via a safety communication channel, another packet having a packet header including an indication of the source ID associated with the remote battery module; and a payload including battery measurement data.

In Example 13, the wBMS network manager of any of examples 1-12 can optionally include where the one or more processing units further establishes, based on the authentication, the safety communication channel with the remote battery module.

In Example 14, the wBMS network manager of any of examples 1-13 can optionally include where the one or more processing units further transmits, to the remote battery module via the safety communication channel, another packet having a packet header including an indication of the source ID associated with the remote battery module; and a payload including a control instruction for the remote battery module.

Example 15 includes a first battery module including a memory to store a list of hardware identifiers (IDs), where each hardware ID in the list is associated with a respective one of a plurality of battery modules, the first battery module being one of the plurality of battery modules; and mapped, based on a predetermined mapping, to a different one of a plurality of source IDs; one or more processing units to determine, based on the predetermined mapping and a hardware ID associated with the first battery module, a first source ID for the first battery module; and an interface to transmit, via a wireless communication channel, a packet including the hardware ID associated with the first battery module and the first source ID.

In Example 16, the first battery module of example 15, where the predetermined mapping is based on an order of the hardware IDs in the list; and the one or more processing units determines the first source ID based on an index that references a hardware ID in the list corresponding to the hardware ID associated with the first battery module.

In Example 17, the first battery module of any of examples 15-16 can optionally include where the predetermined mapping is based on a hash function; and the one or more processing units determines the first source ID by applying the hash function to the list of hardware IDs.

In Example 18, the first battery module of any of examples 15-17 can optionally include where the transmitted packet includes an indication of a connect request.

In Example 19, the first battery module of any of examples 15-18 can optionally include where the one or more processing units further receives, over the wireless communication channel via the interface, an indication of a successful authentication in response to the transmitted packet.

In Example 20, the first battery module of any of examples 15-18 can optionally include where the one or more processing units further receives, over the wireless communication channel via the interface, an indication of an authentication failure in response to the transmitted packet.

In Example 21, the first battery module of any of examples 15-20 can optionally include where the hardware ID associated with the first battery module is a hardware ID of a hardware component at the first battery module.

In Example 22, the first battery module of any of examples 15-21 can optionally include where the hardware component is associated with a safety integrity level.

In Example 23, the first battery module of any of examples 15-22 can optionally include where the hardware ID associated with the first battery module is a serial ID of a battery monitor at the first battery module.

In Example 24, the first battery module of any of examples 15-23 can optionally include where the memory further stores a list of media access control (MAC) IDs, each associated with a wireless transceiver of a respective battery module in the plurality of battery modules; and a serial ID associated with the first battery module of the plurality of battery modules in the list of hardware IDs is referenced by a first index; and a MAC ID associated with the first battery module in the list of MAC IDs is referenced by a second index, the second index being the same as the first index.

In Example 25, the first battery module of any of examples 15-24 can optionally include where the hardware ID associated with the first battery module is a memory state associated with the first battery module.

In Example 26, the first battery module of any of examples 15-25 can optionally include where the one or more processing units further transmits, over a safety communication channel, another packet having a packet header including an indication of the first source ID; and a payload including battery measurement data.

In Example 27, the first battery module of any of examples 15-26 can optionally include where the one or more processing units further receives, over the safety communication channel, another packet having a packet header including an indication of the first source ID; and a payload including a control instruction.

Example 28 includes a method performed by a first wireless communication device in a wireless battery management system (wBMS), the method including communicating, with a second wireless communication device in the wBMS a connect request packet including a first hardware ID of a hardware component at a first battery module and a first source ID associated with the first hardware ID, the hardware component is associated with a safety integrity (e.g., a certain safety integrity level as defined by ISO 61784-3 and/or ISO 26262); and establishing a safety communication channel with the second wireless communication device responsive to the connect request packet.

In Example 29, the method of example 28, where the first hardware ID is one of a plurality of hardware IDs in a list; the first source ID is one of a plurality of source IDs; and each of the plurality of hardware IDs in the list is mapped to one of the plurality of source IDs according to a position of the respective hardware ID within the list, each of the plurality of hardware IDs associated with a different one of a plurality of battery modules.

In Example 30, the method of any of examples 28-29 can optionally include where the first wireless communication device corresponds to the first battery module; the second wireless communication device corresponds to a network manager of the wireless battery management system; and the communicating the connect request packet includes transmitting, to the second wireless communication device, the connect request packet.

In Example 31, the method of any of examples 28-30 can optionally include further including obtaining the first hardware ID that identifies the hardware component; and determining, based on the first hardware ID and a predetermined mapping, the first source ID.

In Example 32, the method of any of examples 28-31 can optionally include where the first wireless communication device corresponds to a network manager of the wBMS; the second wireless communication device corresponds to the first battery module; and the communicating the connect request packet includes receiving, from the second wireless communication device, the connect request packet.

In Example 33, the method of any of examples 28-32 can optionally include searching, using the first source ID in the received connect request packet and a predetermined mapping, for a second hardware ID from a list of hardware IDs; and performing authentication by comparing the first hardware ID in the received connect request packet to the second hardware ID from the list.

In Example 34, the method of any of examples 28-33 can optionally include where the establishing the safety communication channel includes transmitting, to the second wireless communication device, an indication of a successful authentication based on a match between the first hardware ID in the received connect request packet and the second hardware ID from the list.

In Example 35, the method of any of examples 28-34 can optionally include further including communicating, with the second wireless communication device via the safety communication channel, another packet having a packet header including an indication of the first source ID; and a payload including at least one of battery measurement data or a battery module control instruction.

VARIATIONS AND IMPLEMENTATIONS

While embodiments of the present disclosure were described above with references to exemplary implementations as shown in FIGS. 1A-1B and 2-11, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as BMIC, safety CPU, BMS controller, wireless node, wireless manager, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to an SCL protocol in a wBMS, in various communication systems.

Parts of various systems for implementing an SCL protocol in a wBMS as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the apparatuses, battery modules and/or wBMS network manager shown in FIGS. 1A-1B) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

The invention claimed is:

1. A wireless battery management system (wBMS) network manager, comprising: a memory to store a list of hardware identifiers (IDs), wherein each hardware ID in the list is: associated with a respective one of a plurality of battery modules; and mapped, based on a predetermined mapping, to a different one of a plurality of source IDs, wherein the source IDs are based on any one of: a respective hardware ID in the list, a position of the respective hardware ID within the list, a hash function to the list of hardware IDs, or a memory state of a respective battery module; an interface to receive, from a remote battery module over a wireless communication channel, a packet including a source ID that uniquely identifies the battery module, and a hardware ID associated with the remote battery module; and one or more processing units to: configure the predetermined mapping between the hardware ID and the plurality of source IDs; search, using the source ID in the received packet and the predetermined mapping, for a first hardware ID from the list of hardware IDs; and authenticate the remote battery module based on a comparison of the hardware ID in the received packet to the first hardware ID from the list.

2. The wBMS network manager of claim 1, wherein: the predetermined mapping is based on an order of the hardware IDs in the list; and the one or more processing units searches for the first hardware ID from the list by using the source ID in the received packet as an index into the list of hardware IDs.

3. The wBMS network manager of claim 1, wherein the one or more processing units further: transmits, over the wireless communication channel via the interface, an indication of a successful authentication based on a match between the hardware ID in the received packet and the first hardware ID from the list.

4. The wBMS network manager of claim 1, wherein the one or more processing units further: transmits, over the wireless communication channel via the interface, an indication of an authentication failure based on a mismatch between the hardware ID in the received packet and the first hardware ID from the list.

5. The wBMS network manager of claim 1, wherein an individual hardware ID in the list of hardware IDs identifies a hardware component of a respective battery module of the plurality of battery modules, the hardware component associated with a safety integrity level.

6. The wBMS network manager of claim 1, wherein an individual hardware ID in the list of hardware IDs is a serial ID of a battery monitor at a respective battery module of the plurality of battery modules.

7. A first battery module comprising: a memory to store a list of hardware identifiers (IDs), wherein each hardware ID in the list is: associated with a respective one of a plurality of battery modules, the first battery module being one of the plurality of battery modules; and mapped, based on a predetermined mapping, to a different one of a plurality of source IDs that uniquely identifies the respective one of the plurality of battery modules; wherein the source IDs are based on any one of: a respective hardware ID in the list, a position of the respective hardware ID within the list, a hash function to the list of hardware IDs, or a memory state of a respective battery module; one or more processing units to determine, based on the predetermined mapping and a hardware ID associated with the first battery module, a first source ID for the first battery module; and an interface to transmit, via a wireless communication channel, a packet including the hardware ID associated with the first battery module and the first source ID.

8. The first battery module of claim 7, wherein: the predetermined mapping is based on an order of the hardware IDs in the list; and the one or more processing units determines the first source ID based on an index that references a hardware ID in the list corresponding to the hardware ID associated with the first battery module.

9. The first battery module of claim 7, wherein the one or more processing units further: receives, over the wireless communication channel via the interface, an indication of a successful authentication in response to the transmitted packet.

10. The first battery module of claim 7, wherein the one or more processing units further: receives, over the wireless communication channel via the interface, an indication of an authentication failure in response to the transmitted packet.

11. The first battery module of claim 7, wherein: the hardware ID associated with the first battery module is a hardware ID of a hardware component at the first battery module; and the hardware component is associated with a safety integrity level.

12. The first battery module of claim 7, wherein the hardware ID associated with the first battery module is a serial ID of a battery monitor at the first battery module.

13. A method performed by a first wireless communication device in a wireless battery management system (wBMS), the method comprising: communicating, with a second wireless communication device in the wBMS a connect request packet including a first hardware ID of a hardware component at a first battery module and a first source ID associated with the first hardware ID, the hardware component is associated with a safety integrity; and establishing a safety communication channel with the second wireless communication device responsive to the connect request packet; wherein the first hardware ID is one of a plurality of hardware IDs in a list; the first source ID is one of a plurality of source IDs; and each of the plurality of hardware IDs in the list is mapped to one of the plurality of source IDs according to a position of the respective hardware ID within the list, each of the plurality of hardware IDs associated with a different one of a plurality of battery modules, wherein the source IDs are based on any one of: a respective hardware ID in the list, a position of the respective hardware ID within the list, a hash function to the list of hardware IDs, or a memory state of a respective battery module; and wherein the one of the plurality of source IDs uniquely identifies the respective one of the plurality of battery modules.

14. The method of claim 13, wherein: the first wireless communication device corresponds to the first battery module; the second wireless communication device corresponds to a network manager of the wireless battery management system; and the communicating the connect request packet comprises: transmitting, to the second wireless communication device, the connect request packet.

15. The method of claim 14, further comprising: obtaining the first hardware ID that identifies the hardware component; and determining, based on the first hardware ID and a predetermined mapping, the first source ID.

16. The method of claim 13, wherein: the first wireless communication device corresponds to a network manager of the wBMS; the second wireless communication device corresponds to the first battery module; and the communicating the connect request packet comprises: receiving, from the second wireless communication device, the connect request packet.

17. The method of claim 16, further comprising: searching, using the first source ID in the received connect request packet and a predetermined mapping, for a second hardware ID from a list of hardware IDs; and performing authentication by comparing the first hardware ID in the received connect request packet to the second hardware ID from the list.

18. The method of claim 17, wherein the establishing the safety communication channel comprises: transmitting, to the second wireless communication device, an indication of a successful authentication based on a match between the first hardware ID in the received connect request packet and the second hardware ID from the list.

19. The method of claim 13, further comprising: communicating, with the second wireless communication device via the safety communication channel, another packet having: a packet header including an indication of the first source ID; and a payload including at least one of battery measurement data or a battery module control instruction.

* * * * *